United States Patent
Ikuta et al.

(10) Patent No.: US 8,029,910 B2
(45) Date of Patent: Oct. 4, 2011

(54) RESIN COMPOSITION AND COMPOSITE USING THE COMPOSITION AND PRODUCTION PROCESS THEREOF

(75) Inventors: Toru Ikuta, Kobe (JP); Hajime Komada, Himeji (JP); Mitsuteru Mutsuda, Himeji (JP); Hiroaki Arita, Himeji (JP); Naoki Wakita, Himeji (JP)

(73) Assignee: Daicel-Evonik Ltd., Tokyo (JP)

( * ) Notice: Subject to any disclaimer, the term of this patent is extended or adjusted under 35 U.S.C. 154(b) by 0 days.

(21) Appl. No.: 12/773,621

(22) Filed: May 4, 2010

(65) Prior Publication Data
US 2010/0215964 A1 Aug. 26, 2010

Related U.S. Application Data

(62) Division of application No. 10/571,118, filed as application No. PCT/JP03/11750 on Sep. 12, 2003.

(30) Foreign Application Priority Data

Jul. 3, 2002 (JP) .................................. 2002-195036

(51) Int. Cl.
*B32B 27/36* (2006.01)
*B32B 27/40* (2006.01)
*B32B 27/00* (2006.01)
*B32B 27/08* (2006.01)

(52) U.S. Cl. ...................... 428/492; 428/412; 428/423.1; 428/423.9; 428/473.5; 428/474.4; 428/500

(58) Field of Classification Search .................. None
See application file for complete search history.

(56) References Cited

U.S. PATENT DOCUMENTS 7,175,916 B2 * 2/2007 Ikuta et al. ................. 428/476.9

FOREIGN PATENT DOCUMENTS

| EP | 621886 A1 | 11/1994 |
|----|-----------|---------|
| JP | 50-25682 A | 3/1975 |
| JP | 61-204260 A | 9/1986 |
| JP | 62-34933 A | 2/1987 |
| JP | 2-150439 A | 6/1990 |
| JP | 3-133631 A | 6/1991 |
| JP | 3-138114 A | 6/1991 |
| JP | 5-301973 A | 11/1993 |
| JP | 6-220265 A | 8/1994 |
| JP | 7-166043 A | 6/1995 |
| JP | 7-304880 A | 11/1995 |
| JP | 8-156188 A | 6/1996 |
| JP | 9-124803 A | 5/1997 |
| JP | 10-58605 A | 3/1998 |
| JP | 2003-320618 A | 11/2003 |
| WO | WO-93/14155 A1 | 7/1993 |
| WO | WO 02/055296 * | 7/2002 |

OTHER PUBLICATIONS

Office Action of Japanese patent application No. 195036/2002 corresponding to the present case and cited document, JP 2003-049023A and English translation thereof.

* cited by examiner

*Primary Examiner* — Sheeba Ahmed
(74) *Attorney, Agent, or Firm* — Birch, Stewart, Kolasch & Birch, LLP

(57) ABSTRACT

The present invention is directed to a composite comprising a resin element comprising a resin composition and a vulcanized rubber element formed by vulcanizing an unvulcanized rubber, wherein the resin composition comprises a resin, a vulcanization-activating agent for improving adhesiveness of the resin to a rubber, and a stabilizer, and the resin composition and the vulcanized rubber are directly joined together.

16 Claims, No Drawings

RESIN COMPOSITION AND COMPOSITE USING THE COMPOSITION AND PRODUCTION PROCESS THEREOF

This application is a Divisional of co-pending application Ser. No. 10/571,118, filed on Feb. 2, 2007, the entire contents of which are hereby incorporated by reference and for which priority is claimed under 35 U.S.C. §120. Application Ser. No. 10/571,118 is the national phase of PCT International Application No. PCT/JP2003/011750 filed on Sep. 12, 2003 under 35 U.S.C. §371. The entire content of the above-identified application is hereby incorporated by reference.

TECHNICAL FIELD

The present invention relates to a resin composition excellent in adhesiveness to a rubber, a composite (or a composite member) which comprises the resin composition and a rubber integrally joined together and is useful for a mechanical part and machine element, an automobile part and so on, and a process for producing the same.

BACKGROUND ART

A process for adhering a resin molded article to a rubber molded article by an adhesive is known as a process of adhering a resin molded element to a rubber molded element. However, the process using the adhesives complicates the process to cause a troublesome process-control, and not only costs a lot but also does not necessarily give a sufficient adhesive strength.

Meanwhile, a composite of a resin directly bonded to a rubber has been proposed. For example, Japanese Patent Application Laid-Open No. 25682/1975 (JP-50-25682A) discloses a process for producing a rubber-plastic composite, which comprises rubbing a thermoplastic plastic component (e.g., a polyformaldehyde and an olefinic polymer) and a vulcanized rubber component (e.g., polybutadiene, and nitrile) compatible with the thermoplastic plastic component with contacting each other to melt or fuse the surface of the plastic, and solidifying the melted surface of the resin with contacting the thermoplastic resin component and the vulcanized rubber component. However, in the process, since a configuration of the bonding site or position in the composite is restricted, it is difficult to produce a composite of a thermoplastic resin molded article and a rubber molded article, each having a complicated configuration on a bonding site, and to increase the productivity of the composite.

Regarding a polyphenylene ether-rubber composite, Japanese Patent Application Laid-Open No. 204260/1986 (JP-61-204260A) discloses a process for producing a composite, which comprises heating a polyphenylene ether-series resin which may have a styrenic polymer and/or an additive together with a synthetic rubber comprising SBR, BR, IR, IIR or the like in the presence of the vulcanizing system. With respect to an ABS resin-rubber composite, Japanese Patent Application Laid-Open No. 301973/1993 (JP-5-301973A) discloses a process for producing a composite, which comprises laminating an ABS resin molded member and an unvulcanized-rubber sheet composed of a rubber component having a critical surface tension of 37 to 39 mN/m, and subsequently heating the laminated sheet for adhering integrally. Japanese Patent Application Laid-Open No. 124803/1997 (JP-9-124803A) discloses a process for producing a composite member, which comprises heating an acrylonitrile-containing thermoplastic resin (e.g., AS resin, ABS resin) with an acrylonitrile-containing rubber with intimately contacting each other. However, these processes markedly restrict species of resins and rubbers for combination because the thermoplastic resin and the rubber are adhered by utilizing the compatibility for improving bondability (or adhesiveness) between the both components, and therefore the practical applications are much limited.

Referring to a polyamide-rubber composite, Japanese Patent Application Laid-Open No. 150439/1990 (JP-2-150439A), Japanese Patent Application Laid-Open No. 133631/1991 (JP-3-133631A) and Japanese Patent Application Laid-Open No. 138114/1991 (JP-3-138114A) disclose a process for producing a polyamide-rubber composite, which comprises vulcanizing or crosslinking a rubber component with contacting a polyamide-series resin in the presence of the vulcanizing agent, wherein the rubber component comprises a carboxyl group- or an acid anhydride group-containing rubber, a peroxide, a vulcanization-activating agent (e.g., ethylene glycol dimethacrylate, and triallyl isocyanurate), and an alkoxysilane compound. Japanese Patent Application Laid-Open No. 156188/1996 (JP-8-156188A) discloses to obtain a composite member by vulcanizing or crosslinking a carboxyl group- or an acid anhydride group-containing rubber member with contacting closely an epoxy group-containing resin member. Since the processes described in these documents utilize a chemical reaction (a bonding reaction between an amino group and a carboxyl group or an acid anhydride group, a bonding reaction between an epoxy group and a carboxyl group) for adhering the resin and the rubber, a combination of species of resins and rubbers is markedly restricted, and therefore it is difficult to obtain a resin/rubber composite in a wide combination of the resin and the rubber.

Regarding a process for producing a polyester-rubber composite comprising a thermoplastic polyester as a hard component and a vulcanized rubber as a soft component, Japanese Patent Application Laid-Open No. 304880/1995 (JP-7-304880A) discloses a use of a rubber component comprising a rubber, a peroxide vulcanizing agent, a di- or poly-functional maleimide, and, if necessary, a vulcanization-activating agent, and Japanese Patent Application Laid-Open No. 166043/1995 (JP-7-166043A) proposes to use a rubber component comprising a rubber, a peroxide vulcanizing agent, a silane compound, and, if necessary, a vulcanization-activating agent. Further, concerning a composite film or sheet comprising a resin film and a rubber film, Japanese Patent Application Laid-Open No. 58605/1998 (JP-10-58605A) discloses a process for producing a composite film by laminating a rubber film (e.g., silicone rubber, ethylene-propylene-series rubber) comprising a polyfunctional methacrylate as an adhesion-improving agent on a substrate film (e.g., a polyester film), and vulcanizing or crosslinking the laminate. In these processes, while the vulcanization-activating agent is added to the rubber component for improvement of bondability (or adhesiveness), the combination of the resin and the rubber is restricted, and therefore a wide range of rubbers and resins cannot be integrally joined or bonded together with a high bonding strength (or adhesive strength).

It is therefore an object of the present invention to provide a resin composition in which a resin can be certainly and firmly joined (or bonded) to a wide range of rubbers without using an adhesive, and a process for producing the same.

Another object of the present invention is to provide a resin composition which ensures to stably and industrially produce a composite of a rubber and a resin firmly joined (or bonded) to the rubber, and a process for producing the same.

It is still another object of the present invention to provide a composite in which a resin and a rubber are directly joined (or bonded) together certainly and firmly, and a process for producing the same.

DISCLOSURE OF THE INVENTION

The inventors of the present invention made intensive studies to achieve the above objects and finally found that bondability of resins to a wide range of rubbers can be remarkably enhanced or improved by preparing a resin composition comprising a vulcanization-activating agent and a stabilizer in combination. The present invention was accomplished based on the above findings.

That is, the resin composition of the present invention comprises a resin, a vulcanization-activating agent for improving adhesiveness of the resin to a rubber (e.g., a compound having a plurality of polymerizable unsaturated bonds), a stabilizer (e.g., an antioxidant, and a light stabilizer). The resin composition is preferably used as a resin material for producing a composite which comprises the resin composition and a vulcanized rubber formed by vulcanizing an unvulcanized rubber directly joined to the resin composition. In the composite, a resin element comprising the resin composition and a vulcanized rubber element formed from the vulcanized rubber may be directly joined together.

The resin constituting the resin composition may have at least two active atoms on the average per molecule, and the active atoms may be selected from the group consisting of a hydrogen atom and/or a sulfur atom, each atom having an orbital interaction energy coefficient S of not less than 0.006, wherein the orbital interaction energy coefficient S is represented by the following formula (1):

$$S = (C_{HOMO,n})^2 / |E_c - E_{HOMO,n}| + (C_{LUMO,n})^2 / |E_c - E_{LUMO,n}| \quad (1)$$

in the formula, each of $E_c$, $C_{HOMO,n}$, $E_{HOMO,n}$, $C_{LUMO,n}$, and $E_{LUMO,n}$ representing a value calculated by a semiempirical molecular orbital method MOPACPM3, $E_c$ representing an orbital energy (eV) of a radical of a radical-generating agent, $C_{HOMO,n}$ representing a molecular-orbital coefficient of a highest occupied molecular orbital (HOMO) of an n-th hydrogen atom or sulfur atom constituting a constitutive unit of the resin, $E_{HOMO,n}$ representing an orbital energy (eV) of the HOMO, $C_{LUMO,n}$ representing a molecular-orbital coefficient of a lowest unoccupied molecular orbital (LUMO) of the n-th hydrogen atom or sulfur atom constituting the constitutive unit of the thermoplastic resin, and $E_{LUMO,n}$ representing an orbital energy (eV) of the LUMO.

The resin may comprise at least one crosslinkable resin selected from the group consisting of a thermoplastic resin having an unsaturated bond and a thermosetting resin having a crosslinkable functional group.

The vulcanization-activating agent may comprise a compound having a plurality of α,β-ethylenically unsaturated bonds (e.g., a compound having a plurality of (meth)acryloyl groups). The stabilizer may comprise a phenol-series antioxidant, an amine-series antioxidant, a phosphorus-containing antioxidant, a sulfur-containing antioxidant, a hydroquinone-series antioxidant, a quinoline-series antioxidant, a hindered amine-series light stabilizer, a quencher, and others, or may be capable of capturing a radical. The proportion of the vulcanization-activating agent may be about 0.1 to 10 parts by weight relative to 100 parts by weight of the resin, and the proportion of the stabilizer may be about 0.01 to 5 parts by weight relative to 100 parts by weight of the resin. Moreover, the proportion (weight ratio) of the vulcanization-activating agent relative to the stabilizer [the former/the latter] may be about 99/1 to 25/75. Further, the resin composition may comprise a compound having at least two hydrogen atoms on the average per molecule and having a molecular weight of not more than 1000, wherein each of the hydrogen atoms has an orbital interaction energy coefficient S represented by the formula (1) of not less than 0.006.

In the composite, the unvulcanized rubber may be formed from a composition containing at least one vulcanizing agent selected from the group consisting of a radical-generating agent (e.g., an organic peroxide, an azo compound; and a sulfur-containing organic compound) and a sulfur. The proportion of the vulcanizing agent may be about 1 to 10 parts by weight relative to 100 parts by weight of the unvulcanized rubber.

The present invention also includes a process for producing the resin composition, which comprises kneading a resin, a vulcanization-activating agent, and a stabilizer. Moreover, the present invention includes (1) a process for producing a composite which comprises contacting the resin composition with an unvulcanized rubber composition containing a vulcanizing agent, and molding the contacted matter to obtain a composite comprising a rubber member comprising a vulcanized rubber and a resin member joined to the rubber member, wherein a moldable resin material comprises one of the resin composition and a resin member formed from the resin composition, and a moldable rubber material comprises one of the rubber composition containing at least the unvulcanized rubber and a pre-molded rubber article formed from the rubber composition, the moldable resin material is contacted with the moldable rubber material, and the contacted matter is molded with vulcanizing or crosslinking the moldable rubber material, and the vulcanizing agent is active on the contact surface between the moldable resin material and the moldable rubber material; and (2) a process for a composite comprising a vulcanized rubber phase and a resin phase, which comprises kneading the resin composition and a unvulcanized rubber containing a vulcanizing agent, and molding the kneaded matter.

DETAILED DESCRIPTION OF THE INVENTION

The resin composition of the present invention comprises a resin, a vulcanization-activating agent, and a stabilizer. Since the resin composition can highly enhance or improve bondability of the resin to a rubber, the resin composition can be preferably utilized as a resin material for producing a resin/rubber composite in which a resin is directly joined (or bonded) to a vulcanized rubber obtained by vulcanizing an unvulcanized rubber.

[Resin Composition]
[Resin]

The resin used for the resin composition of the present invention is not particularly limited to a specific one, and a wide range of resins (a thermoplastic resin, a thermosetting resin) may be used.

The thermoplastic resin may include, for example, a condensation-series thermoplastic resin such as a polyamide-series resin, a polyester-series resin, a polyurethane-series resin, a poly(thio)ether-series resin (e.g., a polyacetal-series resin, a polyphenylene ether-series resin, a polysulfide-series resin, and a polyether ketone-series resin), a polycarbonate-series resin, a polyimide-series resin, a polysulfone-series resin, or a polyurethane-series resin; a vinyl polymerizable thermoplastic resin such as a polyolefinic resin, a (meth)acrylic resin, a styrenic resin, a halogen-containing resin, or a vinyl-series resin (e.g., a polyvinyl acetate, and a polyvinyl alcohol); and a thermoplastic elastomer.

The thermosetting resin may include, for example, a polycondensation- or addition condensation-series resin such as a phenol resin, an amino-series resin, an epoxy resin, a silicone resin, a thermosetting polyimide-series resin, or a thermosetting polyurethane-series resin; and an addition polymerization-series resin such as a thermosetting acrylic resin, a vinyl ester-series resin, an unsaturated polyester-series resin, or a diallyl phthalate resin.

These resins (the thermoplastic resin, and the thermosetting resin) may be used singly or in combination.

Incidentally, the resin may be a resin having (or showing) a high activity to a vulcanizing agent (e.g., a radical-generating agent) which is utilized for vulcanization of a rubber. Use of such a resin ensures further improvement in adhesiveness of the resin to the rubber in cooperation with the vulcanization-activating agent. The resin active to the vulcanizing agent may include (i) a resin having an active atom, (ii) a resin having a crosslinkable group, and the like (hereinafter, these resins are sometimes generically called simply "resin" or "active resin").

(Resin Having an Active Atom)

The active atom means an atom having (or showing) a high activity to a radical-generating agent, and includes, for example, an active hydrogen atom and an active sulfur atom. Concretely, the resin may be selected depending on the species of the radical-generating agent, and may for example have an active atom having an orbital interaction energy coefficient S represented by the following formula (1) of not less than a given value (e.g., 0.006, and preferably 0.008). The preferred value of the orbital interaction energy coefficient S of the active atom is about 0.006 to 0.06, and preferably about 0.007 to 0.05 (particularly about 0.01 to 0.045). The number of the active atom depends on a bonding position or site of a functional group having the active atom (e.g., an end or terminal, a branched chain, or a main chain), and the number of the active atom per molecule of the resin is, for example, not less than 2 (about 2 to 10000) on the average, preferably not less than 2.5 (about 2.5 to 5000) on the average, and more preferably not less than 3 (about 3 to 1000) on the average. The number of the active atom per molecule of the resin is usually about 2 to 100 (preferably about 2.5 to 50, more preferably about 3 to 25, and particularly about 3 to 20).

$$S = (C_{HOMO,n})^2 / |E_c - E_{HOMO,n}| + (C_{LUMO,n})^2 / |E_c - E_{LUMO,n}| \quad (1)$$

wherein each of the factors, $E_c$, $C_{HOMO,n}$, $E_{HOMO,n}$, $C_{LUMO,n}$ and $E_{LUMO,n}$ representing a value calculated by the semiempirical molecular orbital method MOPACPM3, $E_c$ representing an orbital energy (eV) of a radical of a radical-generating agent; $C_{HOMO,n}$ representing a molecular-orbital coefficient of the highest occupied molecular orbital (HOMO) of an n-th hydrogen atom or sulfur atom constituting a basic (or constitutive) unit of the resin; $E_{HOMO,n}$ representing an orbital energy (eV) of the HOMO; $C_{LUMO,n}$ representing a molecular-orbital coefficient of the lowest unoccupied molecular orbital (LUMO) of the n-th hydrogen atom or sulfur atom constituting the basic unit of the resin; and $E_{LUMO,n}$ representing an orbital energy (eV) of the LUMO.

MOPACPM3 represented by the formula (1) is one of molecular orbital (MO) methods. The molecular orbital method is one of approximations for discussing an electron condition or state in a molecular, and is classified into three main methods; an empirical method such as Huckel's rule, a semiempirical method enhancing an approximation of the Huckel's rule, and a nonempirical method determining strictly a molecular orbital function by only calculation. In recent years, with developing a computer system, the semiempirical method and the nonempirical method are main methods. The molecular orbital method is a most convincible method correlating a molecular structure and chemical reactivity thereof. For example, when searching the term "molecular orbital method" as a keyword in JST Online Information System (JOIS), about 53000 of a registered number can be found (term: 1980 to 2000 May). The MOPACPM3 is the core of NDDO (Neglect of Diatomic Differential Overlap) method which is one of the semiempirical methods.

The MOPACPM3 is used for mainly studying a reaction of an organic compound, and is explained in many literatures and publications [e.g., "Molecular orbital method MOPAC guidebook" (Tsuneo Hirano, Kazutoshi Tanabe; Kaibundo, 1991), "Introduction to Quantum Chemistry, 3rd revised edition" (Teijiro Yonezawa et al., Kagaku Dojin, 1983), "Calculation Chemistry guidebook" (translated by Eiji Osawa et al., written by Tim Clark, Maruzen, 1985)].

A basic unit (or constitutive unit) in the formula (1) means a modeling molecular structure comprising a polymer terminal and about 1 to 3 repeating unit (s). That is, it is difficult to calculate a molecular orbital for a polymer compound itself by MOPACPM3, since the polymer compound has too much numbers of atoms per molecule. Therefore, a calculation may be carried out for a modeling molecular structure (a constitutive unit or basic unit) comprising a polymer terminal and about 2 to 3 repeating units. For example, a molecular structure (repeating unit) of a polybutylene terephthalate (PBT) is generally represented by a chemical formula "—($CH_2$—$CH_2$—$CH_2$—$CH_2$—O—C(=O)—$C_6H_4$—C(=O)—O)$_n$—", and the calculation of a molecular orbital in the formula (1) may be conducted for "HO—$CH_2$—$CH_2$—$CH_2$—$CH_2$—O—C(=O)—$C_6H_4$—C(=O)—OH" as a basic unit.

The orbital interaction energy coefficient S represented by the formula (1) may be referred to as a reactive index, and is defined and explained in various publications. When a chemical reactivity is discussed, the orbital interaction energy coefficient S is used as a parameter for the chemical reactivity in general. For example, "Introduction of Frontier orbital theory" (p. 72, Shinichi Yamabe, Satoshi Inagaki, Kodansha Scientific, 1989) describes that an orbital interaction energy coefficient S indicates a concept "Regarding to an interaction between two orbits, (a) a smaller energy difference between two orbits and (b) a larger overlap between two orbits make the interaction stronger". The formula (1) is based upon an idea of superdelocalizability (Sr) published in 1954 by late Dr. Fukui given a Nobel prize (see "To use a molecular orbital method", p. 71, Minoru Imoto, Kagaku Dojin, 1986), a formula similar to the formula (1) is derived from the concept of Sr on various publications and literatures.

Hereupon, it is important that the molecular orbital method is already widely known for discussion of a molecular structure and chemical reactivity thereof. Therefore, an orbital interaction energy coefficient S (1/eV) defined by the formula (1) does not represent a mere conceptual value, and represents a value meaning a parameter or properties of a material (e.g., a molecular weight, a functional group) for determination of the material.

Incidentally, the radical orbital energy $E_C$ (eV) of a radical-generating agent is preferably calculated based on a radical molecular structure with the use of MOPACPM3, and a predetermined value based on a species of the radical-generating agent may be used for convenience. For example, the $E_C$ value of the radical-generating agent may be −8 eV for an organic peroxide, −5 eV for an azo compound, and −6 eV for a sulfur-containing organic compound excluding a sulfur.

As the hydrogen atom having an orbital interaction energy coefficient S of not less than a predetermined value (e.g., 0.006) (an active hydrogen atom), in the case where the radical-generating agent comprises an organic peroxide, there may be mentioned, for example, a hydrogen atom constituting an amino group (—NH$_2$) (e.g., a terminal amino group), an imino group (—NH—) (e.g., an imino group in a main-chain, or a terminal imino group, —NH— of an amide bond), a methyl group (—CH$_3$), a methylene group (—CH$_2$—) (a methylene group in a main chain, or a terminal methylene group), or a methylidyne group (—CH=) (a methylidyne group in a main-chain, or a terminal methylidyne group).

As the sulfur atom having an orbital interaction energy coefficient S of not less than a predetermined value (e.g., 0.006) (an active sulfur atom), in the case where the radical-generating agent comprises an organic peroxide, there may be mentioned, for example, a sulfur atom constituting a thio group (—S—), a mercapto group (—SH), an alkylthio group (e.g., a $C_{1-4}$alkylthio group such as a methylthio group, or an ethylthio group), or a sulfinyl group (—SO—).

The methyl group includes, for example, a methyl group bonding to an alkylene chain, a cycloalkylene chain, or an aromatic ring; a methyl group bonding to an oxygen atom (e.g., a methyl group in a methoxy group). The methylene group may include, for example, a methylene group of a linear or branched alkylene group forming a main chain or side chain, a methylene group of a (poly)oxyalkylene unit such as a (poly)oxymethylene unit or a (poly)oxyethylene unit, and a methylene group adjacent to a nitrogen atom of an amino group or an imino group. The methylidyne group includes, for example, an α-positioned methylidyne group adjacent to an amino group or an imino group, such as a methylidyne group α-positioned to an amino group in an aminocycloalkyl group.

It is sufficient that a resin has plural (e.g., not less than 2 on average) active atoms per molecule. That is, usually the resin is not constituted by a single molecule, and comprises a mixture of numerous molecules being somewhat different in a structure and a chain length. Therefore, all molecules of the resin are not required essentially to have a plurality of active atoms, and the number of an active atom on average per molecule is to be not less than 2 in calculating a plurality of predictable predominant constitutive or basic units. For example, the number of an active hydrogen atom constituting a polymer having a repeating unit —(NH—(CH$_2$)$_6$—NH—C(=O)—(CH$_2$)$_4$—(C=O))$_n$—(polyamide 66) may be calculated based on a modeling basic unit NH$_2$—(CH$_2$)$_6$—NH—C(=O)—(CH$_2$)$_4$—C(=O)—OH, and when a radical-generating agent comprises an organic peroxide, two hydrogen atoms of a terminal NH$_2$ group comprise an active hydrogen atom (that is, S is not less than 0.006). In this case, the average number N of an active hydrogen atom per polyamide 66 molecule may be calculated with the use of the following formula (2) from a ratio of a terminal NH$_2$ group and a terminal COOH group in the polymer (polyamide 66) as an aggregate;

$$N = 2 \times A$$

wherein "A" represents the average number of a terminal NH$_2$ group per molecule.

For example, in the resin having a ratio of a terminal NH$_2$ group/terminal COOH group=1/1 (molar ratio), the number "A" of the terminal NH$_2$ group per molecule is 1, and the number "N" of the active hydrogen atom per molecule is equal to 2. Moreover, in 1/2 (molar ratio) of terminal NH$_2$ group/terminal COOH group, the number "A" of the terminal NH$_2$ group per molecule shows 2/3, and the number "N" of the active hydrogen atom per molecule is 4/3.

Incidentally, in the case where the resin is a mixed resin comprising a plurality of resins which are different from each other in the number of active atoms, the number of active atoms in the mixed resin may be represented by the average number of active atoms in each resin. That is, the apparent number of active atoms in the mixed resin can be estimated by calculating the number of active atoms individually based on a basic unit for each resin constituting the mixed resin, and averaging the calculated number of the active atom according to a proportion (weight ratio) of each resin. For example, when the mixed resin comprises (A) the above mentioned polyamide 66 (N=2) and (B) the above mentioned polyamide 66 (N=4/3), and the molar ratio of (A)/(B) is 1/1, the number "N" of the active atom per molecule of the mixed resin can be counted as 5/3. Moreover, when the mixed resin comprises (A) the above mentioned polyamide 66 (N=2) and (C) a polyamide 66 having carboxyl group as all terminal groups (N=0) and the molar ratio of (A)/(C) is 3/1; the number "N" of the active atom per molecule of the mixed resin can be counted as 3/2.

As the resin having such an active atom, there may be exemplified, among the above-mentioned resins, a polyamide-series resin, a polyester-series resin, polyacetal-series resin, a polyphenylene ether-series resin, a polysulfide-series resin, a polyolefinic resin, a polyurethane-series resin, a thermoplastic elastomer, an amino-series resin and the like.

Moreover, even when a resin does not have the plural active atoms mentioned above, the resin can be utilized as a modified resin by introducing an active atom (e.g., an amino group, and an oxyalkylene group) into the resin. Such a thermoplastic resin includes, for example, a vinyl polymerization-series resin [e.g., a (meth)acrylic resin (e.g., poly(methyl methacrylate), a methyl methacrylate-styrene copolymer (MS resin), and a polyacrylonitrile resin); a styrenic resin (e.g., a polystyrene; a styrenic copolymer such as an AS resin or a styrene-methylmethacrylate copolymer; a styrenic grafted copolymer such as a HIPS or an ABS resin), a homo- or copolymer comprising a halogen-containing monomer (e.g., a polyvinyl chloride, a vinylidene chloride copolymer), a vinyl-series resin (e.g., a polyvinyl acetate, a polyvinyl alcohol)], a condensation-series resin [e.g., a polycarbonate (e.g., a bisphenol A-based polycarbonate resin), a polyimide-series resin, a polysulfone-series resin, a polyether sulfone-series resin, a polyether ether ketone-series resin, a polyarylate-series resin], and other resins.

In the vinyl polymerization-series resin, a modified-resin may be obtained by introducing an amino group into a resin, and, for example, may be produced by copolymerization of a vinyl monomer and a monomer containing a carboxyl group or an acid anhydride group such as (meth)acrylic acid and maleic anhydride to introduce a carboxyl group or an acid anhydride group into the vinyl polymerization-series resin, and, if necessary, reacting the resulting resin with thionyl chloride to produce an acid chloride group, and reacting the resultant with ammonia, a mono-substituted amine (e.g., a monoalkylamine, a monoarylamine) or the above-mentioned diamine to introduce an amino group into the resin. Further, a copolymerization of a (poly)oxyalkylene glycol mono(meth)acrylate or a (poly)oxyalkylene glycol monoalkylether (meth)acrylate with the vinyl monomer, or a graft-polymerization of the mono(meth)acrylate to the vinyl polymerization-series resin may introduce the active hydrogen atom for a modification of the vinyl polymerization-series resin.

Further, not only the vinyl polymerization-series resin but also the condensation-series resin may be modified by introducing an amino group into the resin, and a modification may be carried out by graft-polymerizing a carboxyl group- or an acid anhydride group-containing monomer with a resin to introduce the carboxyl group or the acid anhydride group into the resin, if necessary, by reacting the resulting resin with thionyl chloride to produce an acid chloride group, and by reacting the acid chloride group with ammonia, a monosubstituted amine, or the above-mentioned diamine to introduce an amino group as same manner as in the above vinyl polymerization-series resin.

Moreover, the resin constituting the resin composition of the present invention may comprise a resin (or a modified resin) containing a given concentration of the active atom, and other resin(s). As other thermoplastic resins, there may be mentioned an unmodified thermoplastic resin corresponding to the modified resin such as a styrenic resin, a (meth)acrylic resin, a homopolymer or copolymer of a halogen-containing monomer (e.g., a fluorine-containing resin), a vinyl-series resin, a polycarbonate-series resin, a polyimide-series resin, a polysulfone-series resin, a polyether sulfone-series resin, a polyether ether ketone-series resin, a polyarylate-series resin, a liquid-crystal polyester resin, and the like.

Moreover, in the thermosetting resin (e.g., an amino-series resin such as a urea resin, an aniline resin, a melamine resin, or a guanamine resin, and a condensation-series resin such as a phenol resin, or an epoxy resin), the active atom may be introduced into the thermosetting resin by crosslinking or curing the resin with a curing agent having the active atom. The curing agent may be selected depending on the species of the resin, and may include, for example, an amine-series curing agent (e.g., an aliphatic polyamine such as triethylenetetramine, and an aromatic polyamine such as metaphenylenediamine, or diaminodiphenylmethane), and an amido-series curing agent (e.g., a polyamidoamine).

In the case of an addition polymerization-series resin having a low concentration of the active atom (e.g., an unsaturated polyester, a vinylester-series resin, and a diallyl phthalate resin) obtained from a radical polymerization, the active atom may be introduced into the resin by the copolymerization with a monomer having the active atom. As such a monomer having the active atom, there may be mentioned, for example, a monomer having an oxy$C_{2-4}$alkylene unit [e.g., a (poly)oxyalkylene glycol mono(meth)acrylate such as a (poly)oxyethylene glycol mono(meth)acrylate; a (poly)oxyalkylene glycol monoalkylether (meth)acrylate such as a (poly)oxyethylene glycol monomethylether (meth)acrylate; a multifunctional monomer (e.g., a (poly)oxyalkylene glycol di(meth)acrylate such as a (poly)oxyethylene glycol di(meth)acrylate, and a di(meth)acrylate of a bisphenol A alkylene oxide-adduct)], a monomer having an amide bond such as an acrylamide (e.g., acrylamide, methylene-bis(meth)acrylamide, and 1,1-bisacrylamide-ethane).

Moreover, into the thermosetting acrylic resin, the active atom may be introduced by using an amino-series resin (e.g., a melamine resin, and a guanamine resin) as a crosslinking agent, or by copolymerizing a monomer constituting the thermosetting acrylic resin and a polyfunctionally polymerizable monomer having the active atom.

The proportion of the resin having the active atom may be about 30 to 100% by weight, preferably about 50 to 100% by weight, and more preferably about 80 to 100% by weight, relative to the total amount of the resin components.

(Resin Having a Crosslinkable Group)

The resin having a crosslinkable group (or crosslinkable group-containing resin) (hereinafter, sometimes referred to as a crosslinkable resin) can be broadly divided into two classes of a thermoplastic resin having an unsaturated bond (polymerizable or crosslinkable unsaturated bond) and a thermosetting resin having a crosslinkable functional group. The crosslinkable resin may have the unsaturated bond and the crosslinkable functional group.

In the thermoplastic resin having an unsaturated bond, the unsaturated bond is not particularly restricted to a specific bond as far as the unsaturated bond can be activated by a vulcanizing agent such as a radical-generating agent, there may be exemplified various bonds (particularly polymerizable unsaturated bonds) showing crosslinkable ability or polymerizable ability by imparting of heat or light. Such an unsaturated bond or a unit having an unsaturated bond may bond to a thermoplastic resin through a connection group [e.g., an ester bond (—OC(=O)—, —C(=O)O—), an amide bond (—NHCO—, —CONH—), an imino bond (—NH—), a urethane bond (—NHC(=O)O—), a urea bond, a biuret bond]. Further, the unsaturated bond or the unit may be located either in a terminal of the resin (terminal of a main chain) and/or in a side chain of the resin, or in a main chain of the resin. Furthermore, the unsaturated bond or the unit may be located in a terminal and/or side chain of the resin, in a main chain of the resin, or both.

As the group having an unsaturated bond, there may be exemplified, for example, a $C_{2-6}$alkenyl group such as vinyl group, 1-propenyl group, isopropenyl group, 1-butenyl group, allyl group, 2-methyl-2-propenyl group, or 2-butenyl group; a $C_{2-6}$alkenyl-$C_{6-20}$aryl group such as 4-vinylphenyl group, or 4-isopropenylphenyl group; a $C_{6-20}$aryl-$C_{2-6}$alkenyl group such as styryl group; a $C_{2-6}$ alkynyl group such as ethynyl group, 1-propynyl group, 1-butynyl group, propargyl group, 2-butynyl group, or 1-methyl-2-propynyl group; a vinylene group which may have a substituent, for example, vinylene group, a mono- or di-$C_{1-6}$alkylvinylene group such as methylvinylene group, ethylvinylene group or 1,2-dimethylvinylene group, and a halovinylene group such as a chlorovinylene group; a vinylidene group; an ethynylene group; and the like.

Concrete embodiments of the thermoplastic resin having an unsaturated bond can be illustrated by the following embodiments such as (i) to (iv):

(i) a resin produced by a reaction of a polymerizable compound having a reactive group (A) and an unsaturated bond with a thermoplastic resin having a reactive group (B) which is reactive to the reactive group (A), (ii) a thermoplastic resin to which an unsaturated bond is introduced by copolymerization or copolycondensation, (iii) a polymer blend comprising a resin having an unsaturated bond and a resin, and (iv) a thermoplastic resin into which an unsaturated bond is introduced by various organic reactions (e.g., introduction of a vinyl group by Reppe reaction using acetylene, introduction of an unsaturated bond by using an organic metal reagent such as vinyl lithium, introduction of an unsaturated bond by coupling reaction).

Among these resins, the preferred unsaturated bond-containing resin is the foregoing resin (i), (ii), or (iii).

In the resin (i), an unsaturated bond can be introduced into a resin by a reaction of a polymerizable compound having at least one reactive group (A) and at least one unsaturated bond, with a resin having a reactive group (B) which is reactive to the reactive group (A) in the polymerizable compound.

As such a representative reactive group (A) in a polymerizable compound, there may be mentioned, for example, (A1) hydroxyl group, (A2) carboxyl group or acid anhydride group thereof, (A3) amino group, (A4) epoxy group, (A5) isocyanate group, and the like. As the combination of a reactive group (A) in a polymerizable compound with a reactive group (B) in a resin, the following combinations can be exemplified. Incidentally, words in the parentheses show a bond form (type or mode) between the reactive group (A) and the reactive group (B).

(A1) Hydroxyl Group:
(B) carboxyl group or acid anhydride group thereof (ester bond), isocyanate group (ester bond)

(A2) Carboxyl Group or Acid Anhydride Group Thereof:
(B) hydroxyl group (ester bond), amino group (amide bond), epoxy group (ester bond), isocyanate group (amide bond)

(A3) Amino Group:
(B) carboxyl group or acid anhydride group thereof (amide bond), epoxy group (imino bond), isocyanate group (amide bond)

(A4) Epoxy Group:
(B) carboxyl group or acid anhydride group thereof (ester bond), amino group (imino bond)

(A5) Isocyanate Group:
(B) hydroxyl group (ester bond), carboxyl group or acid anhydride group thereof (amide bond), amino group (amide bond)

The polymerizable compound can be exemplified by a hydroxyl group-containing compound [e.g., a $C_{3-6}$alkenol such as allylalcohol, 2-buten-1-ol or 3-buten-2-ol; a $C_{3-6}$alkynol such as propargyl alcohol; a $C_{2-6}$alkylene glycol mono(meth)acrylate such as 2-hydroxyethyl (meth)acrylate, 2-hydroxypropyl (meth)acrylate, or butanediol mono(meth)acrylate; a polyoxy$C_{2-6}$alkylene glycol mono(meth)acrylate such as diethylene glycol mono(meth)acrylate; a $C_{2-6}$alkenylphenol such as 4-hydroxystyrene or 4-hydroxy-α-methylstyrene; dihydroxystyrene; vinylnaphthol], a compound containing a carboxyl group or an acid anhydride group thereof [e.g., a $C_{3-6}$alkene-carboxylic acid such as (meth)acrylic acid, crotonic acid or 3-butene acid; a $C_{4-8}$alkene-dicarboxylic acid or an anhydride thereof such as itaconic acid, maleic acid or maleic anhydride; an unsaturated aromatic carboxylic acid such as vinyl benzoic acid; cinnamic acid], a compound containing an amino group (e.g., a $C_{3-6}$ alkenylamine such as allylamine, 4-aminostyrene, diaminostyrene), a compound containing an epoxy group (e.g., allyl glycidyl ether, glycidyl(meth)acrylate), a compound containing an isocyanate group (e.g., vinylisocyanate) and the like.

Incidentally, in the resin (i), the resin may be reformed or modified by being introduced a reactive group (B). As the method for introducing the reactive group (B) into the resin, there may be utilized: (i-1) a method copolymerizing a monomer having a reactive group (B) (such as the above-exemplified polymerizable compound) with a resin material (or a monomer or oligomer, the resin raw materials) in the resin production, and (i-2) various organic reactions such as an oxidative reaction for introduction of a carboxyl group, a halogenation method, a graft method of a polymerizable monomer. Incidentally, in the vinyl polymerizable resins, the reactive group (B) is usually introduced (into the resin) with the use of a monomer having the reactive group (B) as a copolymerizable component, and in any resins including the vinyl polymerizable resins, the reactive group (B) can be easily introduced by graft reaction of the polymerizable compound having the reactive group.

In the resin (ii), as a method for introducing an unsaturated bond, there may be mentioned, for example, a method which comprises copolycondensing (or copolymerizing) a compound having a polyfunctional unsaturated bond as a part of a reactive component (comonomer) [e.g., an unsaturated polycarboxylic acid (or an unsaturated polybasic carboxylic acid) such as an aliphatic unsaturated dicarboxylic acid (e.g., a $C_{4-10}$ aliphatic unsaturated dicarboxylic acid such as maleic acid, maleic anhydride, fumaric acid, itaconic acid, itaconic anhydride, citraconic acid, citraconic anhydride, or methaconic acid); an unsaturated polyhydric alcohol such as an aliphatic unsaturated diol (e.g., a $C_{4-10}$ aliphatic unsaturated diol such as 2-buten-1,4-diol)] in a production of a condensation-series resin (such as a polyamide-series resin, a polyester-series resin). Moreover, in an addition polymerization-series resin (such as an olefinic resin), there may be exemplified a method which comprises copolymerizing a monomer having a conjugated unsaturated bond (e.g., a conjugated $C_{4-10}$ alkadiene which may have a substituent, such as 1,3-butadiene, 2-methyl-1,3-butadiene, 2,3-dimethyl-1,3-butadiene, or chloroprene) as a part of a reactive component (comonomer).

In the resin (iii), the unsaturated bond may be introduced into the thermoplastic resin by forming a polymer blend (or a resin composition) which is obtained by mixing (a) a thermoplastic resin, and (b) a resin having an unsaturated bond (or an unsaturated bond-containing resin).

The thermoplastic resin (a) is not particularly limited to a specific one, and may include various thermoplastic resins [for example, a thermoplastic resin as described below (e.g., a polyamide-series resin, and a polyester-series resin)]. Moreover, the thermoplastic resin (a) may be a resin free from an unsaturated bond, or a resin having an unsaturated bond.

Examples of the unsaturated bond-containing resin (b) may include a thermoplastic resin into which an unsaturated bond is introduced (e.g., the above-mentioned resin (i), (ii), or (iv)), an unsaturated bond-containing rubber [for example, a polyalkenylene (e.g., a poly$C_{4-15}$alkenylene such as a polybutadiene, a polyisoprene, a polypentenamer, a polyheptenamer, a polyoctenamer (a polyoctenylene), a poly(3-methyloctenamer), a polydecenamer, a poly(3-methyldecenamer), or a polydodecenamer), a copolymer of a $C_{4-15}$alkadiene such as a butadiene-isoprene copolymer, and a rubber-modified polyolefin such as a butadiene-modified polyethylene], and others. Incidentally, the poly$C_{4-15}$alkenylene may be obtained by a metathesis polymerization of a cycloolefin (for example, a $C_{5-20}$cycloolefin which may have a substituent, e.g., cyclopentene, cycloheptene, cyclooctene, cyclodecene, or cyclododecene), a partial hydrogenation of a polyalkenylene (e.g., a polybutadiene), or others.

In the resin (iv), the proportion of the resin (b) may be selected from the range that the unsaturated bond in a predetermined concentration can be introduced into the polymer blend, and for example, the proportion of the resin (b) is about 0.5 to 300 parts by weight, preferably about 1 to 100 parts by weight, and more preferably about 5 to 80 parts by weight, relative to 100 parts by weight of the resin (a). In particular, in the case of using an unsaturated bond-containing rubber (e.g., a polyalkenylene) as the resin (b), the proportion of the unsaturated bond-containing rubber may be selected from the range that properties of the resin (a) is not deteriorated, and for example, the proportion of the rubber is about 0.5 to 40 parts by weight, preferably about 1 to 30 parts by weight, and more preferably 2 to 20 parts by weight, relative to 100 parts by weight of the resin (a).

The number of the unsaturated bond is, for example, not less than 0.1 (e.g., about 0.1 to 1000) on the average per molecule of the resin, preferably not less than 1 (e.g., about 1 to 100) on the average, and more preferably not less than 2 (e.g., about 2 to 50) on the average. Moreover, the concentration of the unsaturated bond is, for example, about 0.001 to 6.6 mole relative to 1 kg of resin, preferably about 0.01 to 4 mole, and more preferably about 0.02 to 2 mole.

Examples of the thermosetting resin having a crosslinkable functional group may include a resin having a functional group which shows crosslinkable ability or hardenability in the presence of a crosslinking agent (or a curing agent) or the like. Such a functional group may include, for example, a methylol group, an alkoxymethyl group, an epoxy group, and an isocyanate group. Examples of such a thermosetting resin may include the thermosetting resin mentioned above such as the polycondensation- or addition condensation-series resin (e.g., a phenol resin, an amino-series resin, an epoxy resin, a thermosetting polyimide-series resin, a thermosetting polyurethane-series resin, and a silicone resin), or the addition polymerization-series resin (e.g., an unsaturated polyester-series resin, a vinyl ester-series resin, a diallyl phthalate-series resin, and a thermosetting acrylic resin).

These resins having an active atom or a crosslinkable group may be used singly or in combination. When two or more species of the resins are used, a resin composition may form a composite resin composition such as a polymer alloy.

The resin to be used in the present invention is preferably the above-mentioned active resin. More specifically, the resin is preferably any of the resin having an active atom, the resin having a crosslinkable group, or the resin having an active atom and a cross linkable group. Use of such a resin having an active atom and/or a crosslinkable group can enhance or improve adhesiveness of the resin to a wide range of rubbers in cooperation with the vulcanization-activating agent.

Hereinafter, preferred thermoplastic resins and thermosetting resins will be exemplified.

(1) Polyamide-Series Resin

The polyamide-series resin has an amide bond owing to polycondensation between a carboxyl group and an amino group, and may include, for example, an aliphatic polyamide-series resin, an alicyclic polyamide-series resin, and an aromatic polyamide-series resin. The aliphatic polyamide-series resin is usually employed. The aliphatic polyamide-series resin may include a condensate of an aliphatic diamine component (e.g., a $C_{4-10}$alkylene diamine such as tetramethylenediamine or hexamethylenediamine) and an aliphatic dicarboxylic acid component (e.g., a $C_{4-20}$alkylene dicarboxylic acid such as adipic acid, sebacic acid or dodecanedioic acid), for example, a polyamide 46, a polyamide 66, a polyamide 610, a polyamide 612, a polyamide 1010, a polyamide 1012, a polyamide 1212; a homo- or copolymer of a lactam (e.g., a $C_{4-20}$lactam such as s-caprolactam, or ω-laurolactam) utilizing a ring-opening polymerization of the lactam, or a homo- or copolymer of an aminocarboxylic acid (e.g., a $C_{4-20}$aminocarboxylic acid such as ω-aminoundecanoic acid), for example, a polyamide 6, a polyamide 11, a polyamide 12; a copolyamide obtained by copolymerizing these polyamide components (e.g., a polyamide 6/11, a polyamide 6/12, polyamide 66/11, a polyamide 66/12) and the like.

As the alicyclic polyamide-series resin, there may be exemplified a polyamide in which at least a part among the aliphatic diamine component and/or the aliphatic dicarboxylic acid component is replaced with an alicyclic diamine and/or an alicyclic dicarboxylic acid. The alicyclic polyamide may include, for example, a condensate of the aliphatic dicarboxylic acid component and an alicyclic diamine component [for example, a $C_{5-8}$cycloalkyl diamine such as cyclohexyl diamine, and a bis(aminocyclohexyl)alkane such as bis(aminocyclohexyl)methane or 2,2-bis(aminocyclohexyl)propane)].

As the aromatic polyamide-series resin, there may be mentioned, a polyamide in which at least a part among the aliphatic diamine components and the aliphatic dicarboxylic acid components comprises an aromatic component. The aromatic polyamide may include, for example, a polyamide in which the diamine component comprises an aromatic component [e.g., a condensate of an aromatic diamine (e.g., meta-xylylenediamine) such as MXD-6 and an aliphatic dicarboxylic acid]; a polyamide in which the dicarboxylic acid component comprises an aromatic component [e.g., a condensate of an aliphatic diamine (e.g., trimethylhexamethylenediamine) and an aromatic dicarboxylic acid (e.g., terephthalic acid, isophthalic acid)]; a polyamide in which both the diamine component and the dicarboxylic acid component comprise an aromatic component [e.g., a fully aromatic polyamide such as a poly(m-phenyleneisophthalamide (e.g., Aramid)], and others.

The polyamide-series resin may further include a polyamide comprising a dimeric acid as the dicarboxylic acid component, a polyamide having a branched structure by introducing a small amount of a polyfunctional polyamine and/or a polycarboxylic acid component, a modified polyamide (e.g., an N-alkoxymethylpolyamide), a high crushproof (high impact) polyamide obtained by mixing or graft-polymerizing a modified polyolefin, and a polyamide elastomer having a polyether as a soft segment.

In the polyamide-series resin, an active hydrogen atom includes, for example, a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), in particular the hydrogen atom of the terminal amino group.

In the polyamide-series resin, the proportion of a terminal $NH_2$ group relative to a terminal COOH group is not particularly restricted to a specific one, and may be, for example, selected from the range of about 10/90 to 100/0, preferably about 20/80 to 95/5, and more preferably about 25/75 to 95/5 as a molar ratio of terminal amino group/terminal carboxyl group, when the active hydrogen atom comprises a hydrogen atom of the terminal amino group and a hydrogen atom bonding to the α-positioned carbon atom. Moreover, in the case where the active hydrogen atom comprises only hydrogen atoms of the terminal amino group, the ratio (molar ratio) of terminal amino group/terminal carboxyl group, may be about 50/50 to 100/0, preferably about 60/40 to 95/5, and more preferably about 70/30 to 95/5.

Moreover, in the polyamide-series resin, in the case introducing an unsaturated bond with the resin (i), for example, a residual carboxyl group or a residual amino group may be utilized as the reactive group (B), and in the case introducing the unsaturated bond with the resin (ii), the unsaturated polycarboxylic acid such as maleic acid may be utilized as a part of the copolymerizable component.

(2) Polyester-Series Resin

The polyester-series resin may include, for example, an aliphatic polyester-series resin, and an aromatic polyester-series resin. As the polyester-series resin, an aromatic polyester-series resin (for example, a polyalkylene arylate-series resin or a saturated aromatic polyester-series resin) is usually employed. The aromatic polyester-series resin may include, for example, a poly$C_{2-4}$alkylene terephthalate such as a polyethylene terephthalate (PET) or a polybutylene terephthalate (PBT); a poly$C_{2-4}$alkylene naphthalate corresponding to the polyalkylene terephthalate (e.g., a polyethylene naphthalate); a poly(1,4-cyclohexyldimethylene terephthalate) (PCT). The polyester-series resin may be a copolyester comprising an alkylene arylate unit as a predominant or main component (e.g., not less than 50% by weight). A copolymerizable component of the copolyester includes a $C_{2-6}$alkylene glycol such as ethylene glycol, propylene glycol, butanediol, or hexanediol; polyoxyC$_{2-4}$alkylene glycol; an asymmetrical aromatic dicarboxylic acid such as phthalic acid or isophthalic acid, or an acid anhydride thereof; and an aliphatic dicarboxylic acid such as adipic acid. Moreover, a branched structure may be introduced into a linear polyester by using or modifying with small amounts of a polyol and/or a polycarboxylic acid.

In the case where the aromatic polyester-series resin does not have a predetermined concentration of the active atom(s), a modified polyester-series resin modified with a modifying compound having the active atom(s) (e.g., an aromatic polyester-series resin having at least one member selected from an amino group and an oxyalkylene group) may be used. As the compound having the active atom(s), in particular, an active hydrogen atom, there may be mentioned, for example, a polyamine [e.g., an aliphatic diamine such as a linear- or branched-alkylenediamine having about 2 to 10 carbon atoms, e.g., ethylenediamine, trimethylenediamine, propylenediamine, tetramethylenediamine, pentamethylenediamine, hexamethylenediamine, trimethylhexamethylenediamine, 1,7-diaminoheptane, or 1,8-diaminooctane; an alicyclic diamine such as isophorone diamine, bis(4-amino-3-methylcyclohexyl) methane, or bis(aminomethyl)cyclohexane; and an aromatic diamine such as phenylenediamine, xylylenediamine, or diaminodiphenylmethane]; and a polyol [e.g., (poly)oxyC$_{2-4}$alkylene glycol such as a (poly)oxyethylene glycol, a (poly)oxytrimethylene glycol, a (poly)oxypropylene glycol, or a (poly)oxytetramethylene glycol]. The modification may be conducted by, for example, heating a mixture of a polyester-series resin and the modifying compound to cause an amidation, an esterification or a transesterification reaction. The degree of the modification of the polyester-series resin may depend on an amount of the active hydrogen atom(s) in the compound; and the modifying compound may for example be used in the amount of about 0.1 to 2 mol, preferably about 0.2 to 1.5 mol, and more preferably about 0.3 to 1 mol relative to 1 mol of a functional group (a hydroxyl group or a carboxyl group) of the polyester-series resin. In the transesterification reaction, the amount of the (poly)oxyC$_{2-4}$alkylene glycol to be used may be about 1 to 50 parts by weight, and preferably about 5 to 30 parts by weight relative to 100 parts by weight of the polyester-series resin.

In the polyester-series resin, the active hydrogen atom usually comprises a hydrogen atom of a methylene group of a (poly)oxyalkylene unit. In the modified polyester-series resin, an active hydrogen atom usually comprises a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), and particularly the hydrogen atom of the terminal amino group.

Moreover, in the polyester-series resin, in the case introducing an unsaturated bond as the resin (i), for example, a residual carboxyl group or a residual hydroxyl group may be utilized as the reactive group (B), and in the case introducing the unsaturated bond as the resin (ii), the unsaturated polycarboxylic acid such as maleic acid or the unsaturated polyhydric alcohol such as 2-buten-1,4-diol may be utilized as a part of the copolymerizable component.

(3) Poly(Thio)Ether-Series Resin

The poly(thio)ether-series resin may include a polyoxyalkylene-series resin, a polyphenylene ether-series resin, and a polysulfide-series resin (polythioether-series resin). As examples of the polyoxyalkylene-series resin, there may be mentioned a polyoxyC$_{1-4}$alkylene glycol such as a polyloxymethylene glycol, a polyoxyethylene glycol, a polyoxypropylene glycol, a polyoxyethylene-polyoxypropylene block-copolymer, a polyoxytetramethylene glycol, and the like. Preferred examples of the poly(thiol ether-series resin may include a polyacetal-series resin, a polyphenylene ether-series resin, a polysulfide-series resin, and a polyether ketone-series resin. Incidentally, in the case introducing an unsaturated bond as the resin (i), a residual hydroxyl group, a residual mercapto group and the like may be utilized as the reactive group (B).

(3a) Polyacetal-Series Resin

The polyacetal-series resin may be a homopolymer (homopolymer of formaldehyde) comprising a regular repetition of an acetal bond, or a copolymer (e.g., a copolymer of trioxane with ethylene oxide and/or 1,3-dioxolane) obtained by ring-opening polymerization or others. Moreover, the end or terminal of the polyacetal-series resin may be blocked or capped to stabilize the resin. In the polyacetal-series resin, an active hydrogen atom comprises, for example, a hydrogen atom of an oxymethylene unit, a hydrogen atom of an alkoxy group (particularly methoxy group) of a blocked terminal, and in particular the hydrogen atom of the oxymethylene unit. Moreover, regarding the polyacetal-series resin; in the case introducing an unsaturated bond as the resin (i), a residual hydroxyl group and the like may be utilized as the reactive group (B).

(3b) Polyphenylene Ether-Series Resin

The polyphenylene ether-series resin may include various resins comprising 2,6-dimethylphenylene oxide as a main component, for, example, a copolymer of 2,6-dimethylphenylene oxide and a phenol, and a modified polyphenylene ether-series resin obtained by blending or grafting a styrenic resin in the polyphenylene-series resin. As other modified polyphenylene ether-series resins, there may be mentioned a polyphenylene ether/polyamide-series resin, a polyphenylene ether/saturated polyester-series resin, a polyphenylene ether/polyphenylene sulfide-series resin, a polyphenylene ether/polyolefin-series resin, and the like. In the case of blending with a styrenic resin, the proportion of the styrenic resin may for example be about 2 to 150 parts by weight, preferably about 3 to 100 parts by weight, and more preferably about 5 to 50 parts by weight relative to 100 parts by weight of a polyphenylene ether-series resin. In the polyphenylene ether-series resin, for example, the active hydrogen atom comprises a hydrogen atom of a methyl group bonding to a benzene ring.

(3c) Polysulfide-Series Resin (Polythioether-Series Resin)

The polysulfide-series resin is not particularly restricted to a specific resin so far as the resin has a thio group (—S—) in the polymer chain. Such a resin may include, for example, a polyphenylene sulfide resin, a polydisulfide resin, a polybiphenylene sulfide resin, a polyketone sulfide resin, a polythioether sulfone resin, and the like. Moreover, the polysulfide-series resin may have a substituent such as an amino group, like a poly(aminophenylene sulfide). The preferred polysulfide-series resin is a polyphenylene sulfide resin. In the polysulfide-series resin, the active sulfur atom comprises a sulfur atom of a thio group in the main chain.

(3d) Polyether Ketone-Series Resin

The polyether ketone-series resin may include, for example, a polyether ketone-series resin obtained by a polycondensation between a dihalogenobenzophenone (e.g., dichlorobenzophenone) and a dihydrobenzophenone, a polyether-ether ketone resin obtained by a polycondensation between a dihalogenobenzophenone and a hydroquinone.

(4) Polycarbonate-Series Resin

As the polycarbonate-series resin, an aliphatic polycarbonate-series resin may be used, and there may be usually employed an aromatic polycarbonate-series resin [for example, an aromatic polycarbonate obtained from a reaction between an aromatic dihydroxy compound (e.g., a bisphenol compound such as bisphenol-A, or bisphenol S) and a phosgene or a diester carbonate (e.g., a diaryl carbonate such as a diphenyl carbonate, a dialkyl carbonate such as a dimethyl carbonate)]. In the case introducing an unsaturated bond as the resin (i), in the polycarbonate-series resin, a residual hydroxyl group and the like may be utilized as the reactive group (B).

(5) Polyimide-Series Resin

The polyimide-series resin may include a thermoplastic polyimide-series resin, for example, a polyimide resin obtained by a reaction between an aromatic tetracarboxylic acid or an anhydride thereof (e.g., benzophenone tetracarboxylic acid) and an aromatic diamine (e.g., diaminodiphenylmethane), a polyamide imide resin, a polyester imide resin, or the like. In the case introducing an unsaturated bond as the resin (i), in the polyimide-series resin, a residual carboxyl group or acid anhydride group, a residual amino group, a residual imino group and the like may be utilized as the reactive group (B).

(6) Polysulfone-Series Resin

The polysulfone-series resin may include a polysulfone resin obtained by a polycondensation of a dihalogenodiphenyl sulfone (e.g., dichlorodiphenyl sulfone) and a bisphenol (e.g., bisphenol A or a metal salt thereof), a polyether sulfone resin, a polyallyl sulfone resin (e.g., brand name "RADEL"), or the like.

(7) Polyurethane-Series Resin

The polyurethane-series resin can be obtained by reacting a diisocyanate, a polyol and, if necessary, a chain-extension agent. As the diisocyanate, there may be exemplified an aliphatic diisocyanate such as hexamethylene diisocyanate or 2,2,4-trimethylhexamethylene diisocyanate; an alicyclic diisocyanate such as 1,4-cyclohexane diisocyanate or isophorone diisocyanate; an aromatic diisocyanate such as phenylene diisocyanate, tolylene diisocyanate, or diphenylmethane-4,4'-diisocyanate; an araliphatic diisocyanate such as xylylene diisocyanate; and so on. As the diisocyanate, there may be utilized a compound in which an alkyl group (e.g., methyl group) is substituted on a main chain or a ring thereof.

As the diol, there may be utilized a polyester diol (e.g., a polyesterdiol derived from a $C_{4-12}$ aliphatic dicarboxylic acid component such as adipic acid; a $C_{2-12}$ aliphatic diol component such as ethylene glycol, propylene glycol, butanediol, or neopentyl glycol; a $C_{4-12}$ lactone component such as ε-caprolactone), a polyether diol (e.g., a polyethylene glycol, a polypropylene glycol, a polyoxyethylene-polyoxypropylene block-copolymer, a polyoxytetramethylene glycol, a bisphenol A-alkylene oxide adduct), a polyester ether diol (a polyester diol in which the polyether diol is used as a part of the diol component).

Furthermore, as the chain-extension agent, a $C_{2-10}$ alkylene glycol such as ethylene glycol or propylene glycol as well as a diamine may be used. The diamine may include, for example, an aliphatic diamine such as a linear- or branched-alkylenediamine having about 2 to 10 carbon atoms (e.g., ethylenediamine, trimethylenediamine, tetramethylenediamine, pentamethylenediamine, hexamethylenediamine, trimethylhexamethylenediamine, 1,7-diaminoheptane, and 1,8-diaminooctane) and a linear- or branched-polyalkylenepolyamine (e.g., diethylenetriamine, triethylenetetramine tetraethylenepentamine, and dipropylenetriamine); an alicyclic diamine such as isophoronediamine, bis(4-amino-3-methylcyclohexyl) methane, or bis(aminomethyl)cyclohexane; and an aromatic diamine such as phenylenediamine, xylylenediamine, or diaminodiphenylmethane.

In the polyurethane-series resin, an active hydrogen atom comprises, for example, a hydrogen atom of an alkyl group bonding to a main chain or a ring of a diisocyanate (in particular a hydrogen atom at a benzyl position), a hydrogen atom in an alkylene group of a polyol or a polyoxyalkylene glycol, a hydrogen atom in an amino group of the chain-extension agent.

Moreover, in the polyurethane-series resin, in the case introducing an unsaturated bond as the resin (i), for example, a residual hydroxyl group, a residual amino group, a residual isocyanate group and the like may be utilized as the reactive group (B), and in the case introducing an unsaturated bond as the resin (ii), the unsaturated polycarboxylic acid such as maleic acid or the unsaturated polyhydric alcohol such as 2-buten-1,4-diol may be utilized as a part of the copolymerizable component.

(8) Polyolefinic Resin

The polyolefinic resin may include, for example, a homo- or copolymer of an olefin such as a polyethylene, a polypropylene, an ethylene-propylene copolymer or a poly(methylpentene-1); and a copolymer of an olefin and a copolymerizable monomer (e.g., an ethylene-vinyl acetate copolymer, an ethylene-(meth)acrylic acid copolymer, an ethylene-(meth) acrylate copolymer). These polyolefinic resins may be used singly or in combination.

The preferred polyolefinic resin includes a polypropylene-series resin having a propylene content of not less than 50% by weight (in particular, 75 to 100% by weight), for example, a polypropylene, a propylene-ethylene copolymer, a propylene-butene copolymer, a propylene-ethylene-butene copolymer, and so on. Moreover, the polyolefinic resin preferably has crystallinity.

In the polyolefinic resin, for example, an active hydrogen atom comprises a hydrogen atom of a methylene group constituting a main chain of the polyolefin, a hydrogen atom of a methyl group branched from the main chain.

(9) Halogen-Containing Resin

As the halogen-containing resin, there may be mentioned, for example, a chlorine-containing vinyl-series resin such as a polyvinyl chloride, a polyvinylidene chloride, a copolymer of vinyl chloride and vinyl acetate, or a copolymer of vinylidene chloride and vinyl acetate; a fluorine-containing vinyl-series resin such as a polyvinyl fluoride, a polyvinylidene fluoride, a polychlorotrifluoroethylene, or a copolymer of tetrafluoroethylene and a copolymerizable monomer. The preferred halogen-containing resin is the fluorine-containing vinyl-series resin (e.g., the polyvinyl fluoride and the polyvinylidene fluoride).

(10). Styrenic Resin

As the styrenic resin, there may be exemplified a homopolymer or copolymer of a styrenic monomer (e.g., a polystyrene; a styrene-vinyl toluene copolymer, a styrene-α-methylstyrene copolymer), a copolymer of a styrenic monomer and a copolymerizable monomer (e.g., a vinyl cyanide-series compound such as (meth)acrylonitrile) [for example, a styrene copolymer such as a styrene-acrylonitrile copolymer (AS resin), a (meth)acrylate-styrene copolymer (e.g., MS resin), a styrene-maleic anhydride copolymer, or a styrene-butadiene copolymer; and a styrenic graft copolymer such as an acrylonitrile-butadiene-styrene copolymer (ABS resin), a high-impact polystyrene (HIPS), an acrylonitrile-acrylate-styrene copolymer (AAS resin), an acrylonitrile-chlorinated polyethylene-styrene copolymer (ACS resin), an acrylonitrile-ethylene propylene rubber-styrene copolymer (AES resin), or an acrylonitrile-vinyl acetate-styrene copolymer (AXS resin)].

(11) (Meth)Acrylic Resin

The (meth)acrylic resin may include a homopolymer or copolymer of a (meth)acrylic monomer, a copolymer of a (meth)acrylic monomer and a copolymerizable monomer, and so on. The (meth)acrylic monomer may include, for example, (meth)acrylic acid, a $C_{1-10}$alkyl (meth)acrylate such as methyl (meth)acrylate, ethyl (meth)acrylate, isopropyl (meth)acrylate, butyl (meth)acrylate, or 2-ethylhexyl (meth)acrylate; a $C_{5-10}$cycloalkyl methacrylate such as cyclohexyl (meth)acrylate; a $C_{6-10}$aryl (meth)acrylate such as phenyl (meth)acrylate; a hydroxy$C_{2-10}$alkyl (meth)acrylate such as hydroxyethyl (meth)acrylate; a (meth)acrylamide; a vinyl cyanide-series compound (e.g., (meth)acrylonitrile); and a glycidyl (meth)acrylate. The copolymerizable monomer may include a vinyl-series monomer such as vinyl acetate or vinyl chloride, a styrenic monomer such as styrene or α-methylstyrene, and the like.

In the (meth) acrylic resin, in the case introducing an unsaturated bond as the resin (i), the reactive group (B) can be introduced by utilizing a monomer having the reactive group (B) as a copolymerizable component.

(12) Thermoplastic Elastomer

The thermoplastic elastomer may include, for example, a polyamide-series elastomer (a copolymer comprising a polyamide as a hard segment and an aliphatic polyether as a soft segment), a polyester-series elastomer (a copolymer comprising a polyalkylene arylate as a hard segment and an aliphatic polyether or aliphatic polyester as a soft segment), a polyurethane-series elastomer (a copolymer comprising a polyurethane containing a short-chain glycol as a hard segment and an aliphatic polyether or aliphatic polyester as a soft segment, for example, a polyester-urethane elastomer, a polyether-urethane elastomer, or the like), a polystyrenic elastomer (a block copolymer comprising a polystyrenic block as a hard segment and a diene-polymer block or a hydrogenated block thereof as a soft segment), a polyolefinic elastomer (e.g., an elastomer comprising a polystyrene or polypropylene as a hard segment and an ethylene-propylene rubber or an ethylene-propylene-diene rubber as a soft segment; an olefinic elastomer comprising a hard segment and a soft segment which are different in crystallinity), a polyvinyl chloride-series elastomer, a fluorine-containing thermoplastic elastomer, and so on. As the aliphatic polyether, there may be used a (poly)oxy$C_{2-4}$alkylene glycol (in particular a (poly)oxyethylene glycol) exemplified in the paragraphs of the polyester-series resin and the polyurethane-series resin. As the aliphatic polyester, for example, the polyesterdiol mentioned in the paragraph of the polyurethane-series resin may be used. These thermoplastic elastomers may be used singly or in combination.

When the thermoplastic elastomer is a block copolymer, the block structure is not particularly restricted to a specific one, and may be a triblock structure, a multiblock structure, a star-shaped block structure or other structure.

The preferred examples of the thermoplastic elastomer include a polyamide-series elastomer, a polyester-series elastomer, a polyurethane-series elastomer, a polystyrenic elastomer, and a polyolefinic elastomer.

In the thermoplastic elastomer, an active hydrogen atom may comprise, for example, a hydrogen atom of an oxyalkylene unit constituting a soft segment.

Moreover, a vinyl polymerizable resin [e.g., a (meth) acrylic resin (a polymethyl methacrylate, a methyl methacrylate-styrene copolymer, etc.) and a styrenic resin (a polystyrene; a styrene copolymer such as AS resin; a styrene-series graft copolymer such as HIPS or ABS resin)] may be crosslinked by copolymerization of a multifunctional polymerizable compound having two or more functional groups (e.g., ethylene glycol di(meth)acrylate, diethylene glycol di(meth)acrylate dipropylene glycol di(meth)acrylate, trimethylolpropane tri(meth)acrylate, etc.) and a constitutive monomer.

Examples of the thermosetting resin may include a polycondensation- or addition condensation-series resin (e.g., a phenol resin, an amino-series resin, an epoxy resin, a silicone resin, a thermosetting polyimide-series resin, and a thermosetting polyurethane-series resin), an addition polymerization-series resin (e.g., a thermosetting acrylic resin, a vinylester-series resin, an unsaturated polyester-series resin, and a diallylphthalate-series resin); and the like. These thermosetting resins may be used singly or in combination.

(13) Phenol Resin

The phenol resin may include a novolak resin, a resol resin and so on, and the novolak resin is usually employed. The novolak resin may be obtained by a reaction of a phenol compound with an aldehyde in the presence of an acid catalyst. As such a phenol compound, there may be mentioned, for example, phenol, a $C_{1-4}$alkylphenol (e.g., o-, m- or p-cresol, 2,5-, 3,5- or 3,4-xylenol, 2,3,5-trimethylphenol, ethylphenol, propylphenol), a dihydroxybenzene, a resorcinol, a naphthol, and the like. These phenol compounds may be used singly or in combination. As the aldehyde, there may be mentioned, for example, an aliphatic aldehyde such as formaldehyde (formic aldehyde), paraformaldehyde, acetaldehyde or propionaldehyde, an aromatic aldehyde such as benzaldehyde or salicylaldehyde, and the like. These aldehydes may be used singly or in combination.

(14) Amino-Series Resin

The amino-series resin is usually obtained by a reaction of an amino group-containing compound with an aldehyde (e.g., an aliphatic aldehyde such as formaldehyde (formic aldehyde), acetaldehyde or propionaldehyde, an aromatic aldehyde such as phenylacetaldehyde). The amino-series resin may include a urea resin (e.g., a urea resin obtained by a reaction of urea with an aldehyde), an aniline resin (e.g., an aniline resin obtained by a reaction of an aniline compound such as aniline, naphthylamine, toluidine, xylidine, N,N'-dimethylaniline or benzidine, with an aldehyde), a melamine resin (e.g., a melamine resin obtained by a reaction of melamine with an aldehyde), a guanamine resin (e.g., a guanamine resin obtained by a reaction of a guanamine compound such as benzoguanamine, acetoguanamine or formoguanamine, with an aldehyde) and the like.

(15) Epoxy Resin

The epoxy resin may include a bisphenol-based epoxy resin, a novolak-based epoxy resin, an amine-series epoxy resin, and so on.

As a bisphenol compound constituting the bisphenol-based epoxy resin, there may be exemplified a glycidyl ether of 4,4-biphenol, 2,2-biphenol, bisphenol F, bisphenol AD or bisphenol A.

As a novolak resin constituting the novolak-based epoxy resin, for example, there may be mentioned a novolak resin obtained by a reaction of a phenol compound with an aldehyde, as described in the paragraph of the novolak resin.

As an amine component constituting an amine-series epoxy resin, there may be mentioned, for example, an aromatic amine such as aniline or toluidine, an aromatic diamine such as a diaminobenzene or a xylylenediamine, an aminohydroxybenzene, a diaminophenylmethane, and the like.

(16) Silicone Resin

The a silicone resin may include a silicone resin comprising a unit represented by a formula $R_aSiO_{(4-a)/2}$ (the coefficient "a" is about 1.9 to 2.1 in the formula) and a unit represented by a formula $R_bSiO_{(4-b)/2}$ (the coefficient "b" is about 0.9 to 1.1 in the formula), and the like. In the formulae, R represents, for example, a $C_{1-10}$alkyl group such as methyl, ethyl, propyl or butyl group; a halogenated $C_{1-10}$alkyl group such as 3-chloropropyl group or 3,3,3-trifluoropropyl group; a $C_{2-10}$alkenyl group such as vinyl, allyl or butenyl group; a $C_{6-12}$aryl group such as phenyl, tolyl or naphthyl group; a $C_{3-10}$cycloalkyl group such as cyclopentyl or cyclohexyl group; a $C_{6-12}$aryl-$C_{1-4}$alkyl group such as benzyl or phenethyl group; etc.

(17) Thermosetting Polyimide-Series Resin

The thermosetting polyimide-series resin may include the resin described in the paragraph of the above-mentioned polyimide-series resin.

(18) Thermosetting Polyurethane-Series Resin

The thermosetting polyurethane-series resin may include the resin described in the paragraph of the above-mentioned polyurethane-series resin.

(19) Thermosetting Acrylic Resin

The thermosetting acrylic resin may include the resin described in the paragraph of the above-mentioned (meth) acrylic resin.

(20) Vinylester Resin

The vinylester resin may include a polymer obtained by a reaction of the above-mentioned epoxy resin with a (meth) acrylic acid, a polymer obtained by a reaction of a polyhydric phenol with a glycidyl (meth)acrylate, and the like.

(21) Unsaturated Polyester-Series Resin

The unsaturated polyester-series resin may include an unsaturated polyester obtained by using an unsaturated dicarboxylic acid or an anhydride thereof (e.g., maleic acid, maleic anhydride, fumaric acid) as a dicarboxylic acid component in the above-mentioned polyester-series resin, and the like.

(22) Diallylphthalate Resin

The diallylphthalate resin may include a resin obtained from a diallylphthalate monomer such as diallylorthophthalate or diallylisophthalate, and the like.

[Vulcanization-Activating Agent]

The resin composition of the present invention contains a vulcanization-activating agent for enhancing or improving adhesiveness of a resin to a rubber. In the above-mentioned composite, the vulcanization-activating agent can improve wettability of the resin with the rubber to uniformly bond (or join) to each other, and the vulcanization-activating agent can crosslink the resin with the rubber following vulcanization (or crosslinking) of an unvulcanized rubber with a vulcanizing agent (e.g., a radical-generating agent) to improve the crosslinking density of the resin and the rubber, thereby bonding or adhering the resin to the rubber firmly and directly.

The vulcanization-activating agent may include, for example, an organic compound having a plurality of carbon-carbon double bonds (a polymerizable unsaturated bonds) [e.g., a vinyl-series monomer (e.g., divinylbenzene), an allyl-series monomer (e.g., diallyl phthalate, triallyl phosphate, and triallyl (iso)cyanurate), a (meth)acrylic monomer], a maleimide-series compound, and others. In the case of using the polyester-series resin as the resin, a non-maleimide-series (maleimide-free) vulcanization-activating agent (e.g., an organic compound having a plurality of carbon-carbon double bonds (polymerizable unsaturated bonds)) is usually employed in many cases. These vulcanization-activating agents (activators) may be used singly or in combination.

Examples of the (meth)acrylic monomer may include a bifunctional (meth)acrylate [e.g., a $C_{2-10}$alkylene glycol di(meth)acrylate such as ethylene glycol di(meth)acrylate, propylene glycol di(meth)acrylate, 1,4-butanediol di(meth) acrylate, hexanediol di(meth)acrylate, or neopentyl glycol di(meth)acrylate; a poly$C_{2-4}$alkylene glycol di(meth)acrylate such as diethylene glycol di(meth)acrylate, triethylene glycol di(meth)acrylate, a polyethylene glycol di(meth)acrylate, dipropylene glycol di(meth)acrylate, tripropylene glycol di(meth)acrylate, a polypropylene glycol di(meth)acrylate, or a polytetramethylene glycol di(meth)acrylate; glycerol di(meth)acrylate; trimethylolpropane di(meth)acrylate; pentaerythritol di(meth)acrylate; and di(meth)acrylate of bisphenol A-$C_{2-4}$alkylene oxide-adduct], a tri- or poly-functional (multifunctional) (meth)acrylate [e.g., glycerol tri(meth) acrylate, trimethylolethane tri(meth)acrylate, trimethylolpropane tri(meth)acrylate, pentaerythritol tri(meth)acrylate, pentaerythritol tetra(meth)acrylate, dipentaerythritol tetra (meth)acrylate, dipentaerythritol hexa(meth)acrylate].

The maleimide-series compound having a plurality of maleimide groups may be obtained by a reaction of a polyamine and maleic anhydride. Examples of the maleimide-series compound may include an aromatic bismaleimide [e.g., N,N'-1,3-phenylenedimaleimide, N,N'-1,4-phenylenedimaleimide, N,N'-(3-methyl-1,4-phenylene)dimaleimide, 4,4'-bis(N,N'-maleimide)diphenylmethane, 4,4'-bis(N,N'-maleimide)diphenyl sulfone, 4,4'-bis(N,N'-maleimide) diphenyl ether], and an aliphatic bismaleimide (e.g., N,N'-1, 2-ethylenebismaleimide, N,N'-1,3-propylenebismaleimide, N,N'-1,4-tetramethylenebismaleimide).

The preferred vulcanization-activating agent may include a compound having a plurality (e.g., about 2 to 6, in particular about 3 to 6) of $\alpha,\beta$-ethylenically unsaturated bonds, and a compound having a plurality of (meth)acryloyl groups such as a tri- or polyfunctional (meth)acrylate [e.g., trimethylolpropane tri(meth)acrylate] is preferred.

The amount of the vulcanization-activating agent varies depending on the species of the vulcanization-activating agent or the species of the resin, and may be usually selected from the range in which joining between the resin and the rubber can be prompted. For example, the amount of the vulcanization-activating agent may be selected from the range of about 0.1 to 10 parts by weight, preferably about 0.1 to 5 parts by weight, and more preferably about 0.1 to 3 parts by weight, relative to 100 parts by weight of the resin.

[Stabilizer]

The present invention is characterized by combination use of the vulcanization-activating agent and a stabilizer. The combination use of the vulcanization-activating agent and the stabilizer ensures inhibition or blocking of gel (or fish-eye) generation even in the case using a vulcanization-activating agent having a polymerizable unsaturated bond in a hot mixing process (e.g., a kneading process of a resin and a vulcanization-activating agent). Therefore, the vulcanization-activating agent can effectively function to certainly, and the resin is firmly bonded or joined to the rubber without deteriorating the strength or external appearance of the composite. Accordingly, the stabilizer to be used in the present invention may stabilize the resin, and preferably stabilize at least the vulcanization-activating agent.

As the stabilizer, an antioxidant (including a heat-resistant processing stabilizer), a light stabilizer, or others may be used, or a thermal-polymerization inhibitor (e.g., a hydroquinone compound such as hydroquinone or methylhydroquinone) may be used.

The antioxidant may include, for example, a phenol-series antioxidant, an amine-series antioxidant, a phosphorus-containing antioxidant, a sulfur-containing antioxidant, a hydroquinone-series antioxidant, quinoline-series antioxidant, a ketone-amine resin, and the like. Incidentally, just for reference, brand names are given within the parenthesis.

The phenol-series antioxidant may include a hindered phenol-series antioxidant, for example, a monophenol compound, a bisphenol compound, or a polyhydric phenol compound.

As the monophenol compound, there may be exemplified a mono- or di-branched $C_{3-6}$alkylphenol which may have a substituent [for example, a $C_{1-4}$alkyl-di-branched $C_{3-6}$alkylphenol such as 2,6-di-t-butyl-p-cresol or 2,6-di-t-butyl-4-ethylphenol; a $C_{1-4}$alkoxy-mono or di-branched $C_{3-6}$alkylphenol such as 2-t-butyl-4-methoxyphenol or 3-t-butyl-4-methoxyphenol; a $C_{10-20}$alkyl-(di-branched $C_{3-6}$alkyl-hydroxyphenyl)$C_{2-6}$-carboxylate such as stearyl-β-(3,5-di-t-butyl-4-hydroxyphenyl)propionate; a $C_{3-10}$alkyl-(di-branched $C_{3-6}$alkyl-hydroxybenzylthio)$C_{2-6}$-carboxylate such as 2-ethylhexyl-(2,6-di-t-butyl-4-hydroxybenzylthio)acetate; a di$C_{10-20}$alkyl-(di-branched $C_{2-6}$alkyl-hydroxybenzyl)phosphonate such as distearyl-(3,5-di-t-butyl-4-hydroxybenzyl)phosphonate]; a phenol having a $C_{4-10}$alkylthio group [for example, 2,4-di(octylthio)methyl-6-methylphenol ("Irganox 1520", manufactured by Ciba-Geigy Ltd.)]; a monoester of bisphenol compound and a (meth)acrylic acid [for example, a monoester of a $C_{1-4}$alkylenebis(mono- or di-branched $C_{3-6}$alkylphenol) and a (meth)acrylic acid such as 2-(2-hydroxy-3-t-butyl-5-methylbenzyl)-4-methyl-6-t-butylphenylacrylate ("Sumilizer GM", manufactured by Sumitomo Chemical Co., Ltd.), 2-[1-(2-hydroxy-3-t-butyl-5-methylphenyl)ethyl]-4-methyl-6-t-butylphenylacrylate, or 2-[1-(2-hydroxy-3,5-di-t-pentylphenyl)ethyl]-4,6-di(t-pentyl)phenylacrylate ("Sumilizer GS", manufactured by Sumitomo Chemical Co., Ltd.)]; or the like.

The bisphenol compound may include a $C_{1-6}$alkylenebis(mono- or di-branched $C_{3-6}$alkylphenol) such as 2,2'-methylenebis(4-methyl-6-t-butylphenol), 2,2'-methylenebis(4-ethyl-6-t-butylphenol), 2,2'-ethylidenebis(4,6-di-t-butylphenol), 2,2'-ethylidenebis[4,6-di(t-pentyl)phenol], 4,4'-butylidenebis(3-methyl-6-t-butylphenol), or 4,4'-methylenebis(2,6-di-t-butylphenol); a thiobis(mono- or di-branched $C_{3-6}$alkylpnehol) such as 4,4'-thiobis(3-methyl-6-t-butylphenol); a (mono- or di-branched $C_{3-6}$alkyl-hydroxyphenyl)$C_{2-6}$-carboxylic acid-mono to tetra$C_{2-4}$alkylene glycol ester such as bis[3-(3,5-di-t-butyl-4-hydroxyphenyl) propionic acid]-1,6-hexanediol ester, or bis[3-(3-t-butyl-5-methyl-4-hydroxyphenyl)propionic acid]-triethylene glycol ester ("Irganox 245", manufactured by Ciba-Geigy Ltd.); a diamide of a (mono- or di-branched $C_{3-6}$alkyl-hydroxyphenyl)$C_{3-6}$-carboxylic acid and a $C_{0-8}$alkylenediamine such as hydrazobis(3,5-di-t-butyl-4-hydroxy-hydrocinnamoyl) ("Irganox MD-1024", manufactured by Ciba-Geigy Ltd.), N,N'-trimethylenebis(3,5-di-t-butyl-4-hydroxy-hydrocinnamamide), or N,N'-hexamethylenebis(3,5-di-t-butyl-4-hydroxy-hydrocinnamamide) ("Irganox 1098", manufactured by Ciba-Geigy Ltd.); a diester of a (mono- or di-branched $C_{3-6}$alkyl-hydroxyphenyl)$C_{3-6}$-carboxylic acid and a dihydroxyheterocyclic spiro compound such as 3,9-bis{1,1-dimethyl-2-[β-3-t-butyl-4-hydroxy-5-methylphenyl)propionyloxy]ethyl}-2,4,8,10-tetraoxaspiro[5,5]undecane "Sumilizer GA80", manufactured by Sumitomo Chemical Co., Ltd.); or the like.

The polyhydric phenol compound may include a trisphenol {for example, a tris(mono- or di-branched $C_{3-6}$alkyl-hydroxybenzyl)$C_{6-10}$ arene such as 1,3,5-trimethyl-2,4,6-tris(3,5-di-t-butyl-4-hydroxybenzyl)benzene ("ADK STAB A0-330", manufactured by Asahi Denka Co., Ltd.); a tris(mono- or di-branched $C_{3-6}$alkyl-hydroxyphenyl)$C_{1-6}$alkane such as 1,1,3-tris(2-methyl-4-hydroxy-5-t-butylphenyl)butane; a triester of a mono- or di-branched $C_{3-6}$alkyl-hydroxyphenyl$C_{2-6}$-carboxylic acid and a $C_{3-6}$alkanetriol such as tris[3-(3,5-di-t-butyl-4-hydroxyphenyl) propionic acid]glycerin ester; a tris(mono- or di-branched $C_{3-6}$alkyl-hydroxybenzyl)-S-triazine-trione such as 1,3,5-tris(3',5'-di-t-butyl-4'-hydroxybenzyl)-S-triazine-2,4-6-(1H,3H,5H)trione ("ADK STAB AO-20", manufactured by Asahi Denka Co., Ltd.), or 1,3,5-tris(2',6'-dimethyl-3'-hydroxy-4'-t-butylbenzyl)-S-triazine-2,4,6-(1H,3H,5H)trione}, a tetraphenol {for example, a tetraester of a mono- or di-branched $C_{3-6}$alkyl-hydroxyphenyl$C_{3-6}$-carboxylic acid and a $C_{3-6}$alkanetetraol such as tetrakis[methylene-3-(3',5'-di-t-butyl-4'-hydroxyphenyl)propionate]methane ("Irganox 1010", manufactured by Ciba Specialty Chemicals K.K.); a di(mono- or di-branched $C_{3-6}$alkylhydroxyphenyl)$C_{3-6}$-carboxylic acid-mono to tetra$C_{2-4}$alkyleneglycol ester such as bis[3,3'-bis(4'-hydroxy-3'-t-butylphenyl)butyric acid]glycol ester}, or the like.

The amine-series antioxidant may include an aromatic amine, for example, phenyl-1-naphthylamine, phenyl-2-naphthylamine, N,N'-diphenyl-1,4-phenylenediamine, N-phenyl-N'-cyclohexyl-1,4-phenylenediamine, or others.

As the phosphorus-containing antioxidant, for example, there may be mentioned a phosphite compound such as triisodecyl phosphite, phenyldiisodecyl phosphite, diphenylisodecyl phosphite, triphenyl phosphite, tris(2,4-di-t-butylphenyl) phosphite ("ADK STAB 2112", manufactured by Asahi Denka Co., Ltd.), tris(nonylphenyl) phosphite, dinonylphenylbis(nonylphenyl) phosphite, 2,2-methylenebis(4,6-di-t-butylphenyl)octyl phosphite ("ADK STAB HP-10", manufactured by Asahi Denka Co., Ltd.), 4,4'-butylidenebis(3-methyl-6-t-butylphenyl)ditridecyl phosphite, tris(2,4-di-t-butylphenyl) phosphite, tris(2-t-butyl-4-methylphenyl) phosphite, tris(2,4-di-t-amylphenyl) phosphite, tris(2-t-butylphenyl) phosphite, bis(2-t-butylphenyl)phenyl phosphite, tris[2-(1,1-dimethylpropyl)phenyl]phosphite, tris[2,4-(1,1-dimethylpropyl)phenyl]phosphite, tris(2-cyclohexylphenyl) phosphite, tris(2-t-butyl-4-phenylphenyl) phosphite, diisodecylpentaerythritol diphosphite, cyclic neopentanetetrayl bis(octadecyl) phosphite ("ADK STAB PEP-8", manufactured by Asahi Denka Co., Ltd.), cyclic neopentanetetrayl bis(2,4-di-t-butylphenyl) phosphite ("ADK STAB PEP-24G", manufactured by Asahi Denka Co, Ltd.), or cyclic neopentanetetrayl bis(2,6-di-t-butyl-4-methylphenyl) phosphite ("ADK STAB PEP-36", manufactured by Asahi Denka Co., Ltd.); a phosphine compound such as triethylphosphine, tripropylphosphine, tributylphosphine, tricyclohexylphosphine, diphenylvinylphosphine, allyldiphenylphosphine, triphenylphosphine, methylphenyl-p-anisylphosphine, p-anisyldiphenylphosphine, p-tolyldiphenylphosphine, di-p-anisylphenylphosphine, di-p-tolylphenylphosphine, tri-m-aminophenylphosphine, tri-2,4-dimethylphenylphosphine, tri-2,4,6-trimethylphenylphosphine, tri-o-tolylphosphine, tri-m-tolylphosphine, tri-p-tolylphosphine, tri-o-anisylphosphine, tri-p-anisylphosphine, or 1,4-bis(diphenylphosphino)butane.

The sulfur-containing antioxidant may include, for example, a di$C_{10-20}$alkylester of a thiodi$C_{2-4}$-carboxylicacid such as dilauryl 3,3-thiodipropionate, di(tridecyl) 3,3-thiodipropionate, dimyristyl 2,2-thiodiacetate, dimyristyl 3,3-thiodipropionate, laurylstearyl 3,3-thiodipropionate, or distearyl 3,3-thiodipropionate; 3,9-di(laurylthioethyl)-2,4,8,10-tetraoxaspiro[5.5]undecane.

The hydroquinone-series antioxidant may include, for example, 2,5-di-t-butylhydroquinone, or 2,5-di-t-amylhydroquinone. The quinoline-series antioxidant may include, for example, 6-ethoxy-2,2,4-trimethyl-1,2-dihydroquinoline.

The light stabilizer may include a hindered amine-series light stabilizer (HALS), a quencher, or the like. Incidentally, just for reference, brand names are given within the parenthesis.

As the hindered amine-series light stabilizer (HALS), there may be mentioned, for example, a tetramethylpiperidine which may have a substituent [e.g., a $C_{1-4}$alkoxy-tetramethylpiperidine such as 4-methoxy-2,2,6,6-tetramethylpiperidine; a $C_{6-10}$aryloxy-tetramethylpiperidine such as 4-phenoxy-2,2,6,6-tetramethylpiperidine; a $C_{6-10}$aroyloxy-tetramethylpiperidine such as 4-benzoyloxy-2,2,6,6-tetramethylpiperidine; a (meth)acryloyloxy-tetramethylpiperidine such as 4-methacryloyloxy-2,2,6,6-tetramethylpiperidine ("ADK STAB LA-87", manufactured by Asahi Denka Co., Ltd.), or 4-methacryloyloxy-N-methyl-2,2,6,6-tetramethylpiperidine ("ADK STAB LA-82", manufactured by Asahi Denka Co, Ltd.)], a dipiperidyl ester of an alkanedioic acid, which may have a substituent [e.g., a bis(tetramethylpiperidyl) ester of a $C_{2-10}$alkanedioic acid such as bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate ("ADK STAB LA-77", manufactured by Asahi Denka Co., Ltd.), bis(1,2,2,6,6-pentamethyl-4-piperidyl) sebacate, or bis(N-methyl-2,2,6,6-tetramethyl-4-piperidyl) sebacate ("Sanol LS-765", Sankyo Co., Ltd.)], a dipiperidyl ester of an aromatic dicarboxylic acid, which may have a substituent [e.g., a bis(tetramethylpiperidyl) ester of a $C_{6-10}$ aromatic dicarboxylic acid such as bis(2,2,6,6-tetramethyl-4-piperidyl) terephthalate], a di(piperidyloxy) alkane which may have a substituent [e.g., a di(tetramethylpiperidyloxy) $C_{1-4}$alkane such as 1,2-bis(2,2,6,6-tetramethyl-4-piperidyloxy)ethane]; di(piperidyloxycarbonyl)hydroxyphenylalkane {e.g., di(tetramethylpiperidyloxycarbonyl)-hydroxyphenylalkane such as 1-(3,5-di-t-butyl-4-hydroxyphenyl)-1,1-bis(2,2,6,6-tetramethyl-4-piperidyloxycarbonyl)pentane ("Tinuvin 144", manufactured by Ciba-Geigy Ltd.)}, a di- to tetrapiperidyl ester of a tetracarboxylic acid. [e.g., a tetrakis(tetramethylpiperidyl) ester of a tetracarboxylic acid such as tetrakis(2,2,6,6-tetramethyl-4-piperidyl) ester of 1,2,3,4-butanetetracarboxylic acid ("ADK STAB LA-57", manufactured by Asahi Denka Co., Ltd.); a bis(tetramethylpiperidyl)-bis(triC$_{8-20}$alkyl) ester of a tetracarboxylic acid such as bis(2,2,6,6-tetramethyl-4-piperidyl)-bis(tridecyl) ester of 1,2,3,4-butanetetracarboxylic acid ("ADK STAB LA-67", manufactured by Asahi Denka Co., Ltd.), or bis(N-methyl-2,2,6,6-tetramethyl-4-piperidyl)-bis(tridecyl) ester of 1,2,3,4-butanetetracarboxylic acid ("ADK STAB LA-62", manufactured by Asahi Denka Co., Ltd.)], a $C_{1-4}$ alkylenebis (tetraalkylpiperazinone) [e.g., a $C_{1-4}$alkylenebis (tetramethylpiperazinone) such as 1,1'-ethylenebis(3,3,3',3',5,5,5',5'-octamethylpiperazine-2,2'-dione) ("Goodrite UV-3034", manufactured by Goodrich Corporation)], and a polymeric HALS [e.g., "Chimassorb 944LD" (manufactured by Ciba Specialty Chemicals K.K.), "Tinuvin 622LD" (manufactured by Ciba Specialty Chemicals K.K.), "ADK STAB LA-63" (manufactured by Asahi Denka Co., Ltd.), "ADK STAB LA-68" (manufactured by Asahi Denka Co., Ltd.)].

As the quencher, there may be exemplified an organic nickel complex such as nickelbis(octylphenyl) sulfide, [2,2'-thiobis(4-t-octylphenolate)]-n-butylamine nickel, nickel complex-3,5-di-t-butyl-4-hydroxybenzyl-phosphoromonoethylate, nickel dibutylthiocarbamate, or 1-phenyl-3-methyl-4-decanonylpyrazolate nickel; an organic cobalt complex such as cobalt dicyclohexyldithiophosphate]; or others.

These stabilizers may be used singly or in combination.

The preferred stabilizer includes a stabilizer capable of capturing a radical, e.g., a phenol-series antioxidant or a HALS. Moreover, such a stabilizer capable of capturing a radical may be used in combination with other stabilizer(s). Such a combination includes, for example, a combination of a phenol-series antioxidant with a sulfur-containing antioxidant, a combination of a phenol-series antioxidant with a phosphorus-containing antioxidant, or other combination.

The amount of the stabilizer may be, for example, about 0.01 to 5 parts by weight, preferably about 0.05 to 3 parts by weight, and more preferably about 0.1 to 2 parts by weight (e.g., about 0.1 to 1 part by weight) relative to 100 parts by weight of the resin. Incidentally, in the case where the amount of the stabilizer is too large, although gel generation due to the vulcanization-activating agent can be inhibited, such an excess amount of the stabilizer will prevent the vulcanization-activating agent from effectively functioning, resulting in causing a possibility that bondability (or adhesiveness) of the resin to the rubber is deteriorated.

Moreover, in the case of using the stabilizer capable of capturing a radical (e.g., a phenol-series antioxidant, a HALS) in combination with other stabilizer(s) (e.g., a phosphorus-containing antioxidant, a sulfur-containing antioxidant), the proportion of the former relative to the latter [the former/the latter (weight ratio)] may be about 99/1 to 20/80 (e.g., about 95/5 to 40/60).

Moreover, the proportion of the vulcanization-activating agent relative to the stabilizer may be selected depending on a species of the vulcanization-activating agent or the stabilizer, a mixing or kneading temperature or others, and the proportion [the former/the latter (weight ratio)] may be about 99/1 to 25/75, preferably about 98/2 to 35/65, and more preferably about 97/3 to 45/55 (e.g., about 97/3 to 60/40).

[Vulcanization Auxiliary]

In the present invention, a vulcanization auxiliary may be further used. In the above composite, the vulcanization auxiliary may be added to the after-mentioned unvulcanized rubber, and is usually added to the resin composition in many cases.

The vulcanization auxiliary may be selected depending on the species of the resin, and others, and may include, for example, an oligomer of the condensation-series thermoplastic resin [e.g., an oligomer having a number-average molecular weight of not more than 10.00 (e.g., about 100 to 1000)], a polyamine [e.g., the polyamine described in the paragraph of the above-mentioned (2) polyester-series resin], a polyol [e.g., the polyol described in the paragraph of the above-mentioned (2) polyester-series resin], a polycarboxylic acid or an acid anhydride thereof, a compound having a plurality of aldehyde groups, an epoxy compound, a nitrogen-containing compound (e.g., an amino resin), a compound having a methylol group or an alkoxymethyl group, and a polyisocyanate. These vulcanization auxiliaries may be used singly or in combination.

The preferred vulcanization auxiliary includes a compound having a molecular weight of not more than 1000 and having not less than two of active hydrogen atoms on the average per molecule, among active atoms represented by the formula (1), for example, the oligomer having a number-average molecular weight of not more than 1000 of the condensation-series thermoplastic resin (e.g., an oligomer of the polyamide-series resin, and an oligomer of the polyester-series resin), and the polyamine.

The proportion of the vulcanization auxiliary is, for example, about 0.1 to 30 parts by weight, preferably about 0.5 to 20 parts by weight, and more preferably about 1 to 15 parts by weight, relative to 100 parts by weight of the resin.

Incidentally, the resin composition of the present invention may further comprise various additives, for example, a filler or reinforcing agent, a colorant (coloring agent), a plasticizer, a lubricant, a flame retardant, an antistatic agent, and others.

The form (or shape) of the resin composition is not particularly limited to a specific one. The resin composition may be in the form of a particulate, a pellet, and others.

As described above, the resin composition of the present invention is excellent in bondability (or adhesiveness) to a rubber. Therefore, in the case of using the resin composition as a resin material for the composite of the resin directly joined to the rubber, the resin composition ensures remarkable improvement in bonding strength between the resin and the rubber.

[Composite]

In the composite of the present invention, the resin composition and the vulcanized rubber obtained by vulcanizing an unvulcanized rubber are directly joined (or bonded) together. Concrete embodiments of the composite may include a composite in which a resin element comprising the above-mentioned resin composition and a vulcanized rubber element are directly joined (or bonded) together, for example, (1) a composite in which a resin member comprising the resin composition and a vulcanized rubber member comprising a vulcanized rubber are directly joined together, and (2) a composite (or a composite dispersion) in which a resin phase comprising the resin composition and a vulcanized rubber phase comprising a vulcanized rubber are directly joined together.

[Rubber]

In the composite, the unvulcanized rubber for forming a vulcanized rubber by vulcanization may include various rubbers, for example, a diene-series rubber; an olefinic rubber, an acrylic rubber, a fluorine-containing rubber, a silicone-series rubber, a urethane-series rubber, an epichlorohydrin rubber (e.g., a homopolymer of epichlorohydrin (CO), a copolymer of epichlorohydrin and ethylene oxide (ECO), and a copolymer further copolymerized with allyl glycidyl ether), a chlorosulfonated polyethylene, a propylene oxide rubber (GPO), an ethylene-vinyl acetate copolymer (EAM), a polynorbornene rubber, and a modified rubber thereof (e.g., an acid-introduced (or acid-modified) rubber), and other rubbers. In the case of using a resin comprising a vinyl cyanide-series compound (e.g., (meth)acrylonitrile) (for example, ABS resin), as a rubber a non-vinyl cyanide-series (or vinyl cyanide-free) rubber is used in many cases. These rubbers may be used singly or in combination. Among these rubbers, in view of a practical use, such rubbers are usually employed in a board range as the diene-series rubber, the olefinic rubber, the acrylic rubber, the fluorine-containing rubber, the urethane-series rubber, and so on.

As the diene-series rubber, for example, there may be mentioned a non-vinyl cyanide-series rubber [e.g., a natural rubber (NR); a polymer of a diene-series monomer, such as an isoprene rubber (IR), an isobutylene-isoprene rubber (butyl rubber) (IIR), a butadiene rubber (BR), or a chloroprene rubber (CR); and a styrene-diene copolymerized rubber such as a styrene-butadiene rubber (SBR, e.g., a random copolymer of styrene and butadiene, and a SB block copolymer comprising a styrene block and a butadiene block), a styrene-chloroprene rubber (SCR), or a styrene-isoprene rubber (SIR)], and a vinyl cyanide-series rubber [e.g., an acrylonitrile-diene copolymerized rubber such as an acrylonitrile-butadiene rubber (nitrile rubber) (NBR), a nitrile-chloroprene rubber (NCR), a nitrile-isoprene rubber (NIR), or an acrylonitrile-isoprene-butadiene rubber (NBIR)]. The diene-series rubber also includes a hydrogenated rubber, for example, a hydrogenated nitrile rubber (HNBR) or the like.

The olefinic rubber may include, for example, an ethylene-propylene rubber (EPM), an ethylene-propylene-diene rubber (EPDM), a polyoctenylene rubber, and other rubbers.

The acrylic rubber may include a rubber comprising an alkyl acrylate as a main component, such as a copolymer of an alkyl acrylate and a chlorine-containing crosslinkable monomer (ACM), a copolymer of an alkyl acrylate and acrylonitrile (ANM), a copolymer of an alkyl acrylate and a carboxyl group- and/or epoxy group-containing monomer, and an ethylene-acrylic rubber.

As the fluorine-containing rubber, there may be exemplified a rubber obtained by using a fluorine-containing monomer, for example, a copolymer of vinylidene fluoride and perfluoropropene, and if necessary, tetrafluoroethylene (FKM); a copolymer of tetrafluoroethylene and propylene; a copolymer of tetrafluoroethylene and perfluoromethyl vinyl ether (FFKM).

A silicone rubber (Q) means an organopolysiloxane comprising a unit represented by a formula $R_a SiO_{(4-a)/2}$. In the formula, R represents, for example, a $C_{1-10}$alkyl group such as methyl, ethyl, propyl or butyl group; a halogenated $C_{1-10}$alkyl group such as 3-chloropropyl group or 3,3,3-trifluoropropyl group; a $C_{2-10}$alkenyl group such as vinyl, allyl or butenyl group; a $C_{6-12}$aryl group such as phenyl, tolyl or naphthyl group; a $C_{3-10}$cycloalkyl group such as cyclopentyl or cyclohexyl group; a $C_{6-12}$aryl-$C_{1-4}$alkyl group such as benzyl or phenethyl group. The coefficient "a" is about 1.9 to 2.1 in the formula. The preferred R is methyl group, phenyl group, an alkenyl group (e.g., vinyl group), and a fluoro $C_{1-6}$alkyl group.

A molecular structure of the silicone rubber is usually a linear structure. The molecular structure may have a branched structure partially, and may be branched. A main chain of the silicone rubber can comprise, for example, a poly(dimethylsiloxane) chain, a poly(methylvinylsiloxane) chain, a poly(methylphenyl siloxane) chain, a copolymer chain of the above mentioned siloxane unit [e.g., a dimethylsiloxane-methylvinylsiloxane copolymerized chain, a dimethylsiloxane-methylphenylsiloxane copolymerized chain, a dimethylsiloxane-methyl(3,3,3-trifluoropropyl) siloxane copolymerized chain, a dimethylsiloxane-methylvinylsiloxane-methylphenylsiloxane copolymerized chain]. Both terminals of the silicone rubber may for example be trimethylsilyl group, dimethylvinylsilyl group, silanol group, a tri$C_{1-2}$alkoxysilyl group and the like.

The silicone rubber (Q) may include, for example, a methylsilicone rubber (MQ), a vinylsilicone rubber (VMQ), a phenylsilicone rubber (PMQ), a phenylvinylsilicone rubber (PVMQ), a fluorosilicone rubber (FVMQ), and the like. Further, such a silicone rubber includes not only a solid rubber of a High Temperature Vulcanizable (HTV) silicon rubber but also a Room Temperature Vulcanizable (RTV) silicone rubber or Low Temperature Vulcanizable (LTV) silicone rubber, for example a liquid or paste-like rubber.

The urethane rubber (U) may include, for example, a polyester-based urethane elastomer, a polyether-based urethane elastomer, and other elastomers.

The modified rubber may include a rubber having a carboxyl group or an acid anhydride group, for example, an acid-modified (or acid-introduced) rubber, a non-vinyl cyanide-series modified rubber [e.g., a carboxylic styrene-butadiene rubber (X-SBR), and a carboxylic ethylene-propylene rubber (X-EP(D)M)], and a vinyl cyanide-series modified rubber [e.g., a carboxylic nitrile rubber (X-NBR)].

Incidentally, in the composite (2), the resin (or the resin composition) or the rubber component may be used in the form of particulate. The form (or shape) of the resin (or the resin composition) or the rubber particulate is not particularly limited to a specific one, and may for example be an amorphous, a spherical, a elliptical, or a rod-like form (or shape). The mean particle size of the particulate is, for example, about 0.1 to 800 μm, preferably about 0.5 to 500 μm, and more preferably about 0.8 to 300 μm.

Moreover, in the composite (2), the proportion of the resin relative to the rubber may be suitably set so that properties of the composite dispersion can be effectively expressed. For example, the resin phase/the vulcanized rubber phase (weight ratio) may be about 90/10 to 10/90 (e.g., about 90/10 to 30/70), preferably about 75/25 to 25/75 (e.g., about 75/25 to 50/50), and more preferably about 60/40 to 40/60.

[Vulcanizing Agent]

The vulcanizing agent vulcanizes (or crosslinks) an unvulcanized rubber. Further, depending on the species of the resin or the vulcanizing agent, the agent activates a resin (for example, activates the resin radically by an active atom-drawing reaction in which the active atom is drawn from the resin, or activates a crosslinkable group of the crosslinkable resin), thereby the vulcanizing agent ensures to improve adhesiveness between the resin and the rubber, and the resin can be bonded to the rubber. As the vulcanizing agent, a radical-generating agent or sulfur may be used depending on the species of the resin or the rubber. As the radical-generating agent, there may be exemplified an organic peroxide, an azo compound, a sulfur-containing organic compound, and the like. The vulcanizing agents may be used singly or in combination.

The vulcanizing agent may be added to at least one component selected from the unvulcanized rubber and the resin, e.g., to both components.

The organic peroxide may include, for example, a diacyl peroxide (e.g., lauroyl peroxide, benzoyl peroxide, 4-chlorobenzoyl peroxide, and 2,4-dichlorobenzoyl peroxide), a dialkyl peroxide [e.g., di-t-butyl peroxide, 2,5-di(t-butylperoxy)-2,5-dimethylhexane, 1,1-bis(t-butylperoxy)-3,3,5-trimethylcyclohexane, 2,5-di(t-butylperoxy)-2,5-dimethylhexyne-3,1,3-bis(t-butylperoxyisopropyl) benzene, and dicumyl peroxide], an alkyl peroxide (e.g., t-butylhydroperoxide, cumene hydroperoxide, 2,5-dimethylhexane-2,5-dihydroperoxide, and diisopropylbenzene hydroperoxide), an alkylidene peroxide [e.g., ethylmethylketone peroxide, cyclohexanone peroxide, and 1,1-bis(t-butylperoxy)-3,3,5-trimethylcyclohexane], a peracid ester (e.g., t-butyl peracetate, and t-butyl perpivalate).

The azo compound may include azobisisobutylonitrile and other compounds. The sulfur-containing organic compound may include, for example, a thiuram [e.g., tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), morpholinedisulfide, and an alkylphenoldisulfide].

Such a sulfur may include a powdered sulfur, a precipitated sulfur, a colloidal sulfur, an insoluble sulfur, a highly dispersant sulfur and so on. Moreover, the sulfur also includes a sulfur chloride such as sulfur monochloride or sulfur dichloride.

As the radical-generating agent, a photopolymerization initiator also may be employed as far as a photoirradiation can be applied to an adhesion between the resin composition and the rubber. The photopolymerization initiator or photoinitiator may include, for example, a benzophenone or a derivative thereof (e.g., 3,3'-dimethyl-4-methoxybenzophenone, and 4,4-dimethoxybenzophenone), an alkylphenylketone or a derivative thereof [e.g., acetophenone, diethoxyacetophenone, 2-hydroxy-2-methyl-1-phenylpropan-1-on, benzyldimethylketal, 1-hydroxycyclohexylphenylketone, and 2-benzyl-2-dimethylamino-1-(morpholinophenyl)-butanone], an anthraquinone or a derivative thereof (e.g., 2-methyl anthraquinone), a thioxanthone or a derivative thereof (e.g., 2-chlorothioxanthone, and an alkylthioxanthone), a benzoin ether or a derivative thereof (e.g., benzoin, and a benzoin alkyl ether), a phosphine oxide or a derivative thereof, and others. Further, the radical-generating agent also includes a persulfate (e.g., ammonium persulfate, and potassium persulfate).

Among these compounds, the preferred vulcanizing agent is the organic peroxide. The vulcanizing agent is preferably comprised in at least the unvulcanized rubber, and is usually comprised in the unvulcanized rubber in many cases.

The proportion of the vulcanizing agent can be selected within a range of, for example, about 0.1 to 15 parts by weight relative to 100 parts by weight of an unvulcanized rubber and/or a resin, and is usually about 0.1 to 10 parts by weight, and preferably about 0.1 to 8 parts by weight (e.g., about 1 to 7 parts by weight) relative to 100 parts by weight of an unvulcanized rubber and/or a resin.

[Silane Coupling Agent]

In the present invention, to improve adhesiveness between the resin and the vulcanized rubber, the composite may comprise a silane coupling agent. The silane coupling agent may be added to any one of the unvulcanized rubber (or unvulcanized rubber composition) and the resin (or resin composition), or may be added to the both components.

The silane coupling agent may include a compound having a reactive group (e.g., a hydroxyl group, an alkoxy group, a vinyl group, an amino group, an epoxy group, a mercapto group, a carboxyl group, an isocyanate group, a (meth)acryloyl group), or others.

Examples of the silane coupling agent may include an alkoxysilane (for example, a triC$_{1-4}$alkoxysilane such as trimethoxysilane or triethoxysilane, and a tetraC$_{1-4}$alkoxysilane such as tetramethoxysilane or tetraethoxysilane);

an alkoxysilane having a vinyl group (a vinyltriC$_{1-4}$ alkoxysilane such as vinyltrimethoxysilane or vinyltriethoxysilane);

an alkoxysilane having an amino group (for example, an aminoC$_{2-4}$alkyltriC$_{1-4}$alkoxysilane such as 2-aminoethyltrimethoxysilane, 2-aminoethyltriethoxysilane or 3-aminopropyltriethoxysilane, and an aminodiC$_{2-4}$alkyldiC$_{1-4}$alkoxysilane such as 3-aminopropylmethyldimethoxysilane or 3-aminopropylmethylethoxysilane);

an alkoxysilane having an epoxy group (for example, a glycidyloxyC$_{2-4}$-triC$_{1-4}$alkoxysilane such as 3-glycidyloxypropyltrimethoxysilane, and an (epoxycycloalkyl)C$_{2-4}$alkyltriC$_{1-4}$alkoxysilane such as 2-(3,4-epoxycyclohexyl)ethyltrimethoxysilane);

an alkoxysilane having a mercapto group (for example, a mercaptoC$_{1-4}$alkyltriC$_{1-4}$alkoxysilane such as 3-mercaptopropyltrimethoxysilane, and a mercaptodiC$_{1-4}$alkyldiC$_{1-4}$alkoxysilane such as 3-mercaptopropylmethyldimethoxysilane);

an alkoxysilane having a carboxyl group (for example, a carboxyC$_{1-4}$alkyltriC$_{1-4}$alkoxysilane such as carboxymethyltrimethoxysilane, carboxymethyltriethoxysilane, carboxyethyltrimethoxysilane, or carboxypropyltrimethoxysilane);

an alkoxysilane having an isocyanate group (for example, an isocyanato$C_{1-4}$alkyltri$C_{1-4}$alkoxysilane such as isocyanatoethyltrimethoxysilane, isocyanatoethyltriethoxysilane, or isocyanatopropyltrimethoxysilane);

an alkoxysilane having a (meth) acryloyl group (for example, N-(3-(meth)acryloxy-2-hydroxypropyl)-3-aminopropyltriethoxysilane, 3-(meth)acryloxypropyldimethylmethoxysilane, 3-(meth)acryloxypropyldimethylethoxysilane, and 3-(meth)acryloxypropylmethyldiethoxysilane); and others.

The amount of the silane coupling agent may be usually selected from a range so that the bonding between the resin and the rubber can be accelerated, for example, about 1 to 10 parts by weight, preferably about 2 to 8 parts by weight, and more preferably about 2 to 6 parts by weight relative to 100 parts by weight of the rubber or resin.

[Other Additives]

To the above-mentioned rubber (or rubber composition) may be added, if necessary, various additives, for example, a vulcanization-activating agent (e.g., a vulcanization-activating agent described in the paragraph of the above-mentioned resin composition), a filler, a plasticizer or softening agent, a co-vulcanizing agent (e.g., a metal oxide such as zinc oxide), an age resistor or antiaging agent (e.g., a heat age resistor, an antiozonant, the above-mentioned antioxidant, and the above-mentioned ultraviolet ray absorber), a tackifier, a processing auxiliary, a lubricant (e.g., stearic acid, a metal salt of stearic acid, and a wax), a colorant, a foaming agent, a dispersant, a flame retardant, an antistatic agent, and so forth.

Incidentally, the rubber usually do not contain a vulcanization-activating agent (e.g., a bisphenol-series vulcanization-activating agent such as a di(meth)acrylate of a bisphenol A-$C_{2-3}$alkylene oxide-adduct, and maleimide-series vulcanization-activating agent) in many cases.

The filler (or reinforcer) may include, for example a powdered or particulate filler or reinforcer (e.g., a mica, a clay, a talc, a silicic acid, a silica, a calcium carbonate, a magnesium carbonate, a carbon black, and a ferrite), a fibrous filler or reinforcer (e.g., an organic fiber such as "Rayon", "Nylon", "Vinylon", and "Aramid"; and an inorganic fiber such as a carbon fiber or a glass fiber), and other fillers.

In the case where the rubber comprises a silicone rubber, the most general filler as a reinforcer to be added to the silicone rubber is a powdered silica. The powdered silica used for a silicone rubber is generally roughly classified into two types, a wet silica produced by a wetting method and a dry silica produced by a drying method. A powdered silica suitable for the silicone rubber is the dry silica. The use of dry silica readily enhances a bonding strength between a resin member and a rubber member. When the wet silica is used, water in the wet silica seems to inhibit crosslinking between the resin member and the rubber member. However, the wet silica does not crucially inhibit bonding between the resin member and the rubber member, and even the wet silica can be used depending on the species of a resin and a silicone rubber to be used, the species of a vulcanization-activating agent and its amount, and a molding condition. A mixture of a dry silica and a wet silica is also available.

The plasticizer is not particularly restricted so far as a plasticity can be imparted to the rubber composition, and may include conventional softening agents (e.g., a plant oil such as linolic acid, oleic acid, castor oil, or perm oil; and a mineral oil such as a paraffin, a process oil, or an extender) and plasticizers (e.g., a phthalic acid ester, an aliphatic dicarboxylic acid ester, sulfur-containing plasticizer, and a polyester-series polymer plasticizer).

The amount of the vulcanization-activating agent to be used may be, for example, about 0 to 10 parts by weight, preferably about 0 to 8 parts by weight, and more preferably about 0 to 5 parts by weight, relative to 100 parts by weight of the rubber. The content of the filler may be, for example, about 0 to 300 parts by weight, preferably about 0 to 200 parts by weight, and more preferably about 0 to 100 parts by weight, relative to 100 parts by weight of the rubber. The content of the plasticizer or softening agent may be, for example, about 0 to 200 parts by weight, preferably about 0 to 150 parts by weight, and more preferably about 0 to 120 parts by weight, relative to 100 parts by weight of the rubber. Moreover, each of the co-vulcanizing agent, the age resistor, the processing agent or the lubricant, and the colorant may be used in a proportion of an effective amount, and for example, the amount of the co-vulcanizing agent may be about 0 to 20 parts by weight, preferably about 0.5 to 15 parts by weight, and more preferably about 1 to 10 parts by weight, relative to 100 parts by weight of the rubber.

Incidentally, in the composite dispersion (2), a continuous phase (or a matrix phase) constituting the composite dispersion may be formed by any one of the resin and the rubber. Such a composite dispersion may include, for example, (2a) a composite dispersion which comprises a continuous phase comprising a rubber phase, and a dispersed phase comprising a resin phase, (2b) a composite dispersion which comprises a continuous phase comprising a resin phase, and a dispersed phase comprising a rubber phase, and others.

In the embodiment (2a), resin properties (e.g., slipping property, and wear (or abrasion) resistance) can be imparted to the composite while making use of vulcanized rubber properties (e.g., elasticity, cushioning property (or buffering property), and flexibility). In the embodiment (2b), vulcanized rubber properties (e.g., anti-slipping property due to friction resistance, and adhesiveness to a counterpart member) can be imparted to the composite while making use of resin properties (e.g., mechanical properties such as rigidity, and stiffness).

Moreover, the composite dispersion (2) may have an islands-in-an ocean structure in which a dispersed phase is independently dispersed in the continuous phase, and the shape or form of the dispersed phase may be a particulate, an ellipsoidal, a spherical, a bar-like, and a fiber-like shape. The dispersed phase preferably has a spherical shape, and is preferably dispersed in the continuous phase uniformly. Incidentally, the mean particle size of the dispersed phase is, for example, about 0.1 to 1000 μm, preferably about 1 to 750 μm, and more preferably about 10 to 500 μm (e.g., about 50 to 150 μm), as far as properties of a material for forming the dispersed phase can be expressed. Moreover, in the case of using a crosslinked or cured particle as a rubber, the mean particle size of the dispersed phase corresponds to the mean particle size of the crosslinked or cured particle.

Further, in the composite dispersion (2), the resin phase and the rubber phase may be joined together with the dispersed particle partially exposed on the surface of the composite dispersion. For example, in the case where the resin phase is the dispersed phase, the composite dispersion may have resin properties (e.g., low coefficient of friction) on the surface thereof while holding properties of the rubber constituting the continuous phase (e.g., high flexibility and cushioning property).

Moreover, the composite of the present invention may be a composite in which the composite dispersion (2) and other molded article (e.g., a resin molded article, and a vulcanized rubber molded article) are joined together at the contact surface.

[Process for Producing Resin Composition]

The resin composition of the present invention may be produced by mixing (particularly, kneading) the resin, the vulcanization-activating agent, and the stabilizer. The kneading may be carried out by a conventional kneader (e.g., an extruder, a kneader, and a Banbury mixer). Incidentally, before kneading, these components may be mixed with a conventional mixer (e.g., a Henschel mixer, a tumbler mixer, and a ribbon blender).

The kneading temperature may be selected, depending on the species of the resin, from temperatures at which the resin can be molten. For example, the kneading temperature is about 120 to 400° C., preferably about 130 to 350° C., and more preferably about 150 to 300° C. In the present invention, due to the presence of the stabilizer, the resin and the vulcanization-activating agent can be kneaded without deactivation of the vulcanization-activating agent even when the kneading temperature is a temperature at which the vulcanization-activating agent is self-crosslinked.

[Process for Producing Composite]

The production process of the composite can be classified broadly depending on the embodiments of the composite (the composite (1), and the composite (2)).

(i) Regarding the production of the composite (1), the composite (1) in which a resin member joins to a rubber member may be produced by contacting the resin composition (a resin composition comprising a resin, vulcanization-activating agent, and a stabilizer) with an unvulcanized rubber containing a vulcanizing agent (particularly, a radical-generating agent), and molding the contacted matter, wherein the resin member comprises the resin composition and the rubber member comprises a vulcanized rubber obtained from the unvulcanized rubber. The composite may be produced by contacting a moldable resin material with a moldable rubber material, and molding the contacted matter with vulcanizing or crosslinking the moldable rubber material.

Incidentally, the moldable resin material may be the resin composition, or may be a resin member (or resin molded article) precedently formed from the resin composition. Moreover, the moldable rubber material is not particularly limited to a specific one as long as the moldable rubber material contains at least an unvulcanized rubber and the vulcanizing agent is active on the contact surface with the moldable resin material. The moldable rubber material may be an unvulcanized rubber composition, or a pre-molded rubber article in which a rubber is partly vulcanized or crosslinked.

That is, the composite in which the resin member and the rubber member are joined together may be produced by contacting the resin composition with an unvulcanized rubber composition comprising an unvulcanized rubber and a vulcanizing agent (or an unvulcanized rubber composition further containing the vulcanization-activating agent), and molding the contacted matter with vulcanizing or crosslinking the unvulcanized rubber composition.

Moreover, as long as the vulcanizing agent is active, at least one member selected from the resin member (or resin molded article) and the rubber member (rubber molded article) may be pre-molded. For example, the composite may be produced by (a) contacting a resin member comprising the resin composition with an unvulcanized rubber composition, and molding the unvulcanized rubber composition with vulcanization or crosslinking; (b) contacting the resin composition with a pre-molded rubber article formed by vulcanization or crosslinking of a rubber composition in advance, and molding the resin composition; or (c) contacting a pre-molded rubber article formed by vulcanization or crosslinking of a rubber composition in advance with a resin member comprising the resin composition. Incidentally, in the pre-molded rubber article, it is sufficient that the vulcanizing agent may be active at least on the contact surface with the moldable resin material. The vulcanizing agent may reside in the pre-molded rubber article.

More concretely, the process of the present invention includes a process which comprises contacting or meeting (or converging) the resin composition with an unvulcanized rubber composition while molding each of the resin composition and the unvulcanized rubber composition to bond or adhere directly the resin member and the vulcanized rubber member from the unvulcanized rubber composition (one-step method); a process which comprises contacting a resin member obtained by preliminary molding or forming of the resin composition with an unvulcanized rubber composition, and vulcanizing or crosslinking the unvulcanized rubber composition with molding to join or bond the resin member and the vulcanized rubber member (two-step method); a process comprising a step for contacting a resin member obtained by preliminary molding or forming of the resin composition with a preformed rubber article formed by partially molding (or partially vulcanizing or crosslinking) an unvulcanized rubber composition, and a step, for vulcanizing or crosslinking the pre-molded rubber article to bond or adhere the resin member and the vulcanized rubber member (three-step method); and other molding methods.

The preferred process includes the one-step method and the two-step method (particularly the two-step method). In the one-step method, a composite (a composite molded article) can be obtained by melting and kneading each of the resin composition and the unvulcanized rubber composition, injecting or extruding the molten and kneaded compositions into a metal mold having a desired cavity or configuration with use of, for example, a conventional multi-molding apparatus (e.g., a multi-injection molding apparatus, a multilayer extruder), and vulcanizing or crosslinking the unvulcanized rubber on or after the molding. The resin composition and the unvulcanized rubber composition may be mixed or mingled at (or in) the contact interface area between these compositions.

In the two-step method, a conventional molding apparatus (e.g., an injection molding apparatus, an extrusion molding apparatus, a thermal-press molding apparatus) can be used for molding the resin member, and a conventional molding apparatus (e.g., an injection molding apparatus, a press molding apparatus a transfer molding apparatus, an extrusion molding apparatus) can be used for molding the rubber member. For example, a vulcanized rubber member and a resin member may be bonded or adhered by placing or setting a resin member into a mold (or a cavity) in conformity with a configuration of a composite, injecting or extruding an unvulcanized rubber composition on the resin member, and vulcanizing or crosslinking the unvulcanized rubber composition. Moreover, when the shape of the composite is a plate- or sheet-like member having a two-dimensional configuration, the composite may be produced by laminating a plate- or sheet-like unvulcanized rubber composition on a resin member, and vulcanizing or crosslinking the unvulcanized rubber composition without the mold (or cavity). Incidentally, when contacting (e.g., closely contacting or adhering) a resin member (or a resin composition) with an unvulcanized rubber composition, a pressure molding may be conducted by applying a pressure suitably or may be conducted under a reduced pressure with use of a thermalpress molding or an injection molding in order to remove a volatile component or a gas component from the unvulcanized rubber composition.

The vulcanization (or curing) or crosslinking temperature (or a bonding temperature between the rubber member and the resin member) may for example be selected from about 70 to 250° C., preferably about 100 to 230° C., and more preferably about 150 to 220° C. The pressure loaded to the rubber and the resin may for example be selected from within the range of about 0.1 to 350 MPa, preferably about 1 to 150 MPa, and more preferably about 2 to 100 MPa.

Incidentally, in the production process of the composite, at least one component selected from the group consisting of the unvulcanized rubber and the resin composition may contain the vulcanization auxiliary (e.g., the polyamine). The vulcanization auxiliary is usually added to the resin composition in many cases.

Moreover, as the process of the invention, it is also effective that a surface of the resin member obtained by molding the resin composition is treated with a solvent capable of dissolving or swelling the resin member by a treatment such as coating or dipping, and the treated surface is contacted with the unvulcanized rubber composition. The solvent may be selected, depending on species of the resin member and may include, for example, a hydrocarbon (e.g., an aliphatic hydrocarbon such as hexane or octane, an alicyclic hydrocarbon such as cyclohexane, and an aromatic hydrocarbon such as toluene or xylene), an alcohol (e.g., an alcohol such as isopropanol, butanol, or cyclohexanol; and a haloalkylalcohol such as tetrafluoroethanol or hexafluoroisopropanol), a phenol compound (e.g., phenol, cresol), an organic acid (e.g., formic acid, acetic acid, trifluoroacetic acid, and trichloroacetic acid), an ester (e.g., ethyl acetate, and butyl acetate), a ketone (e.g., acetone, methyl ethyl ketone, and methyl isobutyl ketone), an ether (e.g., dioxane, diethyl ether, and tetrahydrofuran), a sulfoxide (e.g., dimethyl sulfoxide), an amide (e.g., dimethylformamide, and dimethylacetoamide), and a mixed solvent thereof.

For example, to a resin comprising a polyamide resin, a solvent such as a phenol compound (e.g., phenol, and cresol), an organic acid (e.g., formic acid), a ketone (e.g., hexafluoroacetone), an alcohol (e.g., hexafluoroisopropyl alcohol) may be coated singly or in combination with a conventional solvent on the contacting surface with the rubber member. Moreover, for example, in the case of a resin comprising a polyphenylene ether resin, as the solvent or swelling agent, there may be exemplified with a hydrocarbon (e.g., toluene), a ketone (e.g., acetone, methyl ethyl ketone, and hexafluoroacetone), an ether (e.g., tetrahydrofuran), an amide (e.g., dimethylformamide), an alcohol (e.g., hexafluoroisopropyl alcohol), and so on.

After treating the resin member with the solvent, even if the solvent is removed from the resin member by washing, drying, or other methods, the firm bonding of the vulcanized rubber member to the resin member can be realized by contacting the treated surface of the resin member with the unvulcanized rubber composition.

(ii) Regarding the production process of the composite (or the composite dispersion) (2), the composite (2) may be produced by kneading the resin composition and a rubber, and molding the kneaded matter. Incidentally, the rubber may be either an unvulcanized rubber (in particular an unvulcanized rubber containing a vulcanizing agent) or a vulcanized rubber. The vulcanization or crosslinking of the unvulcanized rubber may be carried out in an appropriate stage, for example, in a molding (or forming) step, or after molding step.

Incidentally, at least one phase selected from the vulcanized rubber phase and the resin phase (particularly the vulcanized rubber phase) may be formed from a composition containing a vulcanizing agent (particularly a radical-generating agent), or the vulcanized rubber phase may be formed from a composition containing a vulcanization-activating agent. Incidentally, the vulcanizing agent and/or the vulcanization-activating agent may be added to the rubber beforehand, or added in the kneading process.

More specifically, the composite (2) of the present invention may be obtained by kneading the resin composition and an unvulcanized rubber (in particular an unvulcanized rubber composition containing a vulcanizing agent), molding the kneaded matter into a predetermined shape (or form), and vulcanizing or crosslinking the unvulcanized rubber in the molding process or after the molding process.

Further, the composite dispersion (2) of the present invention may be obtained by kneading the resin composition and a vulcanized rubber (a vulcanized rubber composition), and molding the kneaded matter into a predetermined shape (or form). In the process, usually the vulcanized rubber may be used in the form of a vulcanized particulate by freezing and pulverizing the rubber beforehand, or by polymerization of the unvulcanized rubber with a vulcanizing agent.

The kneading may be carried out by using a conventional kneader (e.g., an extruder). Incidentally, in the case of kneading the thermosetting resin or a composition thereof and the unvulcanized rubber or the vulcanized rubber, the kneading is carried out in the condition on which the thermosetting resin is not cured. Moreover, except that the dispersed phase is formed by a vulcanized rubber phase, the kneading of the unvulcanized rubber is usually conducted in the condition on which the rubber is not vulcanized.

The molding (or forming) method may include an extrusion molding, an injection molding, a blow molding, and others, and is usually an extrusion molding or an injection molding. The shape (or form) of the molded article is not particularly limited to a specific one, and a plate-like, a sheet-like, a tubular, or other form. Incidentally, the molding temperature is appropriately settable depending on a raw material to be used (e.g., the resin and the rubber). The molding temperature is, for example, about 50 to 300° C., preferably about 75 to 250° C., more preferably about 100 to 225° C. (e.g., about 150 to 200° C.).

The composite dispersion may be obtained by vulcanizing or crosslinking the molded article in the molding process or after molding. The vulcanization may be carried out under a reduced pressure, and is usually carried out under an atmospheric pressure. The vulcanization or crosslinking temperature may be, for example, selected from the range of about 70 to 250° C., preferably about 100 to 230° C., and more preferably about 150 to 220° C.

Incidentally, in the production process of the composite (2), at least one component selected from the unvulcanized rubber and the resin composition may contain the vulcanization auxiliary (e.g., the polyamine). The vulcanization auxiliary is usually added to the resin composition in many cases.

According to the present invention, since the resin composition comprises the vulcanization-activating agent and the stabilizer in combination, the resin can be certainly and firmly joined (or bonded) to the rubber without an adhesive.

Moreover, use of the resin composition as a resin material ensures stably industrial production of a composite comprising a resin certainly and firmly joined (or bonded) to a rubber.

INDUSTRIAL APPLICABILITY

In thus obtained composite, the rubber and the resin are joined together in a significantly high strength by vulcanization. Therefore, such a composite ensures effective performance of both resin and rubber properties, and effective utilization as various applications, for example, an automobile part (e.g., a vibration- or shock-absorbing bush, a spring plate, a door lock member, a radiator mount), a rubber vibration isolator, a valve, an electrical plug, and other parts or elements.

EXAMPLES

The following examples are intended to describe this invention in further detail and should by no means be interpreted as defining the scope of the invention. In Examples and Comparative Examples, the following resin compositions and rubber compositions were used.

Resins A1 to A3

As a thermoplastic resin, a polyamide 612 (a polycondensation product of hexamethylenediamine and dodecanedicarboxylic acid) was produced, and the following resins or resin compositions (A1 to A3) were prepared. Incidentally, an MOPACPM3 calculation was carried out according to the following basic unit:

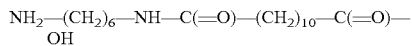

$NH_2-(CH_2)_6-NH-C(=O)-(CH_2)_{10}-C(=O)-$
$\quad\quad\quad\quad\quad\quad\quad\quad\quad OH$ Resin (A1):

Preparation of Resin A1: an Aqueous Solution Containing a salt of hexamethylenediamine with dodecanedicarboxylic acid in an amount of 80% by weight was heated at 220° C. under an applied pressure (inner pressure) (17.5 kg/cm² (1715 MPa)) in an autoclave substituted with nitrogen gas, and removed water with the nitrogen gas from the reaction system over 4 hours. Subsequently, the temperature of the system was gradually increased up to 275° C. over 1 hour to remove water remaining in the system, the applied pressure (inner pressure) of the autoclave was reduced to be an atmospheric pressure. After cooling, a polyamide 612 was obtained. The resultant polymer had a number average molecular weight (Mn) of about 20000 to 25000, and a molar ratio of terminal amino group/terminal carboxyl group=about 1/1, and in the case where a vulcanizing agent was a radical-generating agent, the number of active hydrogen atom having the orbital interaction energy coefficient S of not less than 0.006 was calculated as 4 per molecule. The polymer was used alone as Resin (A1).

Resin (A2):

Preparation of Resin A2: The resin (A1) and the following resin (A3) were kneaded in a weight ratio of 1/1 [the former/the latter] by a biaxial extruder to give a polyamide 612 having a number average molecular weight (Mn) of 22000 and a molar ratio of terminal amino group/terminal carboxyl group=about 3/7. Regarding the resultant polymer, in the case where a vulcanizing agent was a radical-generating agent, the number of active hydrogen atom having the orbital interaction energy coefficient S of not less than 0.006 was calculated as 2.4 per molecule. The polymer was used as Resin (A2).

Resin (A3):

Preparation of Resin A3: To an aqueous solution containing a salt of hexamethylenediamine with dodecanedicarboxylic acid in a concentration of 80% by weight was added a predetermined amount of dodecanedicarboxylic acid, and the mixture was heated at 220° C. under an applied pressure (inner pressure) (17.5 kg/cm² (1715 MPa)) in an autoclave substituted with nitrogen gas, and removed water with the nitrogen gas from the reaction system over 4 hours. Subsequently, the temperature of the system was gradually elevated up to 275° C. over 1 hour to discharge residual water in the system, and the applied pressure (inner pressure) of the autoclave was reduced to be an atmospheric pressure. After cooling, a polyamide 612 was obtained. The obtained polymer had a number average molecular weight (Mn) of about 20000 and a ratio of terminal amino group/terminal carboxyl group was about 1/9, and in the case where a vulcanizing agent was a radical-generating agent, the number of active hydrogen atom having the orbital interaction energy coefficient S of not less than 0.006 was calculated as 0.8 per molecule. The polymer was used alone as Resin (A3).

Resin (B)

A polyamide 6 was prepared as a thermoplastic resin. Incidentally, an MOPACPM3 calculation was carried out according to the following formula:

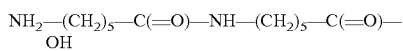

$NH_2-(CH_2)_5-C(=O)-NH-(CH_2)_5-C(=O)-$
$\quad\quad\quad\quad\quad OH$

Preparation of Resin B: an Aqueous Solution Containing ε-caprolactam in an amount of 80% by weight was heated at 250 to 260° C. in the presence of a small amount of phosphoric acid in an autoclave substituted with nitrogen gas to remove water with nitrogen gas from the reaction system over 4 hours. Subsequently, the temperature of the inside system was gradually elevated to 275° C. for taking 1 hour to remove a residual water to outside system. After cooling, a polyamide 6 was obtained. The obtained polymer had a number average molecular weight (Mn) of about 20000 to 25000 and a ratio of terminal amino group/terminal carboxyl group being about 1/1, and in the case where a vulcanizing agent was a radical-generating agent, the number of active hydrogen atom having the orbital interaction energy coefficient S of not less than 0.006 was calculated as 4 per molecule. The polymer was used alone as Resin (B).

Resin (C)

A polybutylene terephthalate was produced as a thermoplastic resin. Incidentally, an MOPACPM3 calculation was carried out according to the following basic unit:

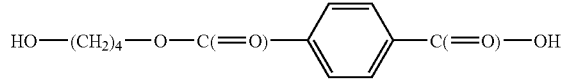

$HO-(CH_2)_4-O-C(=O)-\text{C}_6\text{H}_4-C(=O)-OH$

Preparation of Resin C: to a Polymerization Reactor (Tube) which was equipped with a stirrer, a nitrogen-introducing unit and a distilling unit and connected to a vacuum system, 1.82 g of calcium acetate and 3.64 g of antimony oxide were added into the mixture of 883 g of distilled and purified dimethyl terephthalate and 819 g of butanediol. The tube was heated at 180° C. in an oil bath with supplying nitrogen gas at a sluggish pace. At the point when a distillation amount of methanol was reached to a level of theory value, the mixture was stirred with increasing the temperature of the system gradually from 250 to 260° C. and with gently enhancing a degree of vacuum to reach not higher than 100 Pa. With distilling produced butanediol in small portions, the condensation reaction was progressed for 2 to 3 hours The relative viscosity of the reaction product was measured ad libtum in a mixed solvent comprising tetrachloroethane and phenol in a ratio (the former/the latter) of 40/60, and the reaction was completed after the number average molecular weight of the product reached about 10000. Regarding the obtained polymer, in the case where a vulcanizing agent was a radical-generating agent, the number of active hydrogen atom having the orbital interaction energy coefficient S of not less than 0.006 was calculated as 0 per molecule. The resultant resin was used alone as Resin (C).

Resin (D)

A polyphenylene sulfide ("Fortlon 0220A9", manufactured by Polyplastics Co., Ltd.) was used as a thermoplastic resin (Resin (D)). In the case where a vulcanizing agent was a radical-generating agent, the number of active hydrogen atom was calculated as not less than 2 per molecule. Incidentally, an MOPACPM3 calculation was carried out according to the following formula:

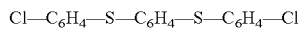

Cl—$C_6H_4$—S—$C_6H_4$—S—$C_6H_4$—Cl

Resin (E)

As a thermoplastic resin, an alicyclic polyamide [a polycondensation product of bis(4-aminocyclohexyl)methane and dodecanedicarboxylic acid] was prepared. Incidentally, an MOPACPM3 calculation was carried out according to the following basic unit:

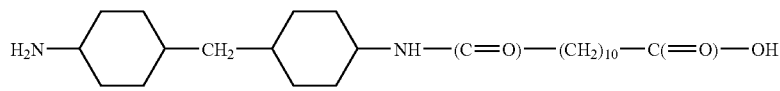

Preparation of Resin E: a Preparation Procedure was conducted in the same manner as in the resin (A1) except that the combination of monomers was bis(4-aminocyclohexyl)methane and dodecanedicarboxylic acid, and a polymer having a number average molecular weight (Mn) of 2000 to 25000 and a ratio of terminal amino group/terminal carboxyl group being about 1/1 was obtained. In the case where a vulcanizing agent was a radical-generating agent, the number of active hydrogen atom having the orbital interaction energy coefficient S of the polymer of not less than 0.006 was calculated as 3 per molecule. The resin was used alone as Resin (E).

[Unvulcanized Rubber Composition (R)]

The following components were blended at predetermined proportions to prepare unvulcanized rubber compositions (R1 to R2).

Rubber Composition (R1)

(i) 100 parts by weight of an ethylene-propylene-diene rubber ("Keltan 509×100" manufactured by DSM), (ii) 5.5 parts by weight of a radical-generating agent [an organic peroxide (dicumyl peroxide)], (iii) 1 part by weight of a filler ("N582" manufactured by Asahi Carbon Co., Ltd.), (iv) 5 parts by weight of a plasticizer ("Diana Process Oil NS100" manufactured by Idemitsu Kosan Co., Ltd.), (v) 3 parts by weight of zinc oxide, and (vi) 1 part by weight of stearic acid Rubber Composition (R2)

(i) 100 parts by weight of a vinyl silicone rubber ("Silicone rubber SH851" manufactured by Toray Dow Corning Co., Ltd.), and (ii) 1.0 part by weight of a radical-generating agent [an organic peroxide (dicumyl peroxide)]

[Test Method]

(Gel Generation Test)

To the resins were added a vulcanization-activating agent (TRIM: trimethylolpropane trimethacylate) and a stabilizer [N,N'-hexamethylenebis (3,5-di-t-butyl-4-hydroxyhydrocinnamamide) ("Irganox 1098", manufactured by Ciba-Geigy Ltd.)] in the proportion shown in Table 1, and the resulting matter was melt-kneaded (temperature condition: 260° C. for Resins A1 to A3, Resin B and Resin C; 300° C. for Resin D and 280° C. for Resin E). The kneaded matter was extruded in the form of a strand from a tip to observe the state of the strand, and was evaluated on the basis of the following criteria.

"C": The strand swung from side to side and up and down at the tip. Additionally, the surface of the strand drawn by a drawing machine was rough and had a plurality of gels.

"B": Although the strand did not swing in the tip part, the surface of the strand drawn by a drawing machine considerably had the touch of gels.

"A": No strand swung in the tip part, and there was no touch of gels on the surface of the strand drawn by a drawing machine.

(Bonding Test)

To the resins were added a vulcanization-activating agent (TRIM: trimethylolpropane trimethacylate) and a stabilizer [N,N'-hexamethylenebis (3,5-di-t-butyl-4-hydroxyhydrocinnamamide) ("Irganox 1098" manufactured by Ciba-Geigy Ltd.)] in a proportion shown in Table 1, and the resulting matter was melt-kneaded to subject to an injection molding at various temperature conditions shown in Table 1 (230° C., 260° C., 290° C., and 320° C.), and resin flat plates (100 mm×100 mm×3 mm) each having various heat histories were obtained. Regarding each flat plate, the flat plate was stored in a rubber mold for press molding having a horizontal cavity of 100 mm×100 mm×6 mm. The unvulcanized rubber composition having a combination shown in Table 1 was placed at the head of the flat plate, and heat-compressed at 170° C. for 10 minutes to vulcanize the rubber and join the resin flat plate and the rubber together. Incidentally, on the occasion of the joining, a part of corresponding to one-third of the resin flat plate was covered with an aluminum foil to secure a tong hold. Thus obtained flat plate comprising the resin/rubber composite was cut to a width of 30 mm in the vertical direction, and the cut piece was used as a test piece. The tong hold of the test piece was fixed with upper and lower fasteners, and drawn with a tension speed of 50 mm/min. by using a universal tensile tester. Then, the piece was subjected to 180° C. peel test, and evaluated based on the following criteria.

"A": Cohesive failure is observed in the rubber layer over the whole peel surface.

"B": Cohesive failure is observed in about 70% of the peel surface in the rubber layer, and about 30% of the peel surface has peeling in the interface between the rubber and the resin.

"C": Cohesive failure is observed in about 50% of the peel surface in the rubber layer, and about 50% of the peel surface has peeling in the interface between the rubber and the resin.

"D": Most of the peel surface has peeling in the interface, and sufficient bonding strength is not observed.

The results are shown in Table 1. Incidentally, Table 1 also has some cases in which no vulcanization-activating agent is added to the resin.

As apparent from Table 1, in Examples, addition of the vulcanization-activating agent and the stabilizer to the resin ensured effective function of vulcanization-activating agent, and the resin and the rubber were firmly joined together.

TABLE 1

| | Resin Composition | | | | | Resin/Rubber Composite | | | | |
|---|---|---|---|---|---|---|---|---|---|---|
| | | Active atom | Vulcanization-activating agent | Stabilizer | Vulcanization-activating agent/Stabilizer | Gel generation | Rubber | Kneading temperature of resin | | | |
| | Resin | Number | parts by weight | parts by weight | Weight ratio | test | composition | 230° C. | 260° C. | 290° C. | 320° C. |
| Com. Ex. 1 | A1 | 4 | 3 | 0 | — | C | R1 | A | B | B | B |
| Ex. 1 | A1 | 4 | 3 | 0.1 | 97/3 | B | R1 | A | A | B | B |
| Ex. 2 | A1 | 4 | 3 | 0.5 | 86/14 | A | R1 | A | A | A | B |
| Ex. 3 | A1 | 4 | 3 | 1 | 75/25 | A | R1 | A | A | B | B |
| Ex. 4 | A1 | 4 | 3 | 5 | 38/62 | A | R1 | C | C | C | C |
| Com. Ex. 2 | A1 | 4 | 3 | 10 | 23/77 | A | R1 | D | D | D | D |
| Com. Ex. 3 | A2 | 2.4 | 3 | 0 | — | C | R1 | A | B | C | C |
| Ex. 5 | A2 | 2.4 | 3 | 0.5 | 86/14 | A | R1 | A | A | A | B |
| Com. Ex. 4 | A3 | 0.8 | 0 | 0 | — | A | R1 | D | D | D | D |
| Ex. 6 | A3 | 0.8 | 3 | 0.5 | 86/14 | A | R1 | C | C | C | C |
| Com. Ex. 5 | B | 4 | 3 | 0 | — | C | R2 | A | A | B | B |
| Ex. 7 | B | 4 | 3 | 0.5 | 86/14 | A | R2 | A | A | A | B |
| Com. Ex. 6 | C | 0 | 0 | 0 | — | A | R2 | D | D | D | D |
| Ex. 8 | C | 0 | 3 | 0.5 | 86/14 | A | R2 | A | A | A | B |
| Com. Ex. 7 | D | 2 or over | 0 | 0 | — | A | R2 | D | D | D | D |
| Ex. 9 | D | 2 or over | 3 | 0.5 | 86/14 | A | R2 | — | — | A | B |
| Com. Ex. 8 | E | 3 | 3 | 0 | — | C | R2 | — | D | D | D |
| Ex. 10 | E | 3 | 3 | 0.5 | 86/14 | A | R2 | — | A | A | B |

The invention claimed is:

1. A composite comprising:
   a resin element comprising a resin composition; and
   a vulcanized rubber element formed by vulcanizing an unvulcanized rubber,
   wherein the resin composition comprises a resin, a vulcanization-activating agent for improving adhesiveness of the resin to a rubber, and a stabilizer,
   the proportion of the vulcanization-activating agent is 0.1 to 10 parts by weight relative to 100 parts by weight of the resin,
   the proportion of the stabilizer is 0.01 to 5 parts by weight relative to 100 parts by weight of the resin,
   the proportion (weight ratio) of the vulcanization-activating agent relative to the stabilizer is 99/1 to 25/75, and
   the resin composition and the vulcanized rubber are directly joined together.

2. The composite according to claim 1, wherein the vulcanization-activating agent comprises a compound having a plurality of polymerizable unsaturated bonds, and the stabilizer comprises at least one member selected from the group consisting of an antioxidant and a light stabilizer.

3. The composite according to claim 1, wherein the resin has at least two active atoms on the average per molecule, and the active atoms are selected from the group consisting of a hydrogen atom and/or a sulfur atom, each atom having an orbital interaction energy coefficient S of not less than 0.006, wherein the orbital interaction energy coefficient S is represented by the following formula (1):

$$S = (C_{HOMO,n})^2 / |E_c - E_{HOMO,n}| + (C_{LUMO,n})^2 / |E_c - E_{LUMO,n}| \quad (1)$$

in the formula, each of $E_c$, $C_{HOMO,n}$, $E_{HOMO,n}$, $C_{LUMO,n}$, and $E_{LUMO,n}$ representing a value calculated by a semiempirical molecular orbital method MOPACPM3, $E_c$ representing an orbital energy (eV) of a radical of a radical-generating agent, $C_{HOMO,n}$ representing a molecular-orbital coefficient of a highest occupied molecular orbital (HOMO) of an n-th hydrogen atom or sulfur atom constituting a constitutive unit of the resin, $E_{HOMO,n}$ representing an orbital energy (eV) of the HOMO, $C_{LUMO,n}$ representing a molecular-orbital coefficient of a lowest unoccupied molecular orbital (LUMO) of the n-th hydrogen atom or sulfur atom constituting the constitutive unit of the thermoplastic resin, and $E_{LUMO,n}$ representing an orbital energy (eV) of the LUMO.

4. The composite according to claim 1, wherein the resin comprises at least one member selected from the group consisting of a polyamide-series resin, a polyester-series resin, a poly(thio)ether-series resin, a polycarbonate-series resin, a polyimide-series resin, a polysulfone-series resin, a polyurethane-series resin, a polyolefinic resin, a halogen-containing vinyl-series resin, a styrenic resin, a (meth)acrylic resin, a thermoplastic elastomer, a phenol resin, an amino-series resin, an epoxy resin, a thermosetting polyimide-series resin, a thermosetting polyurethane-series resin, a silicone resin, an unsaturated polyester-series resin, a vinyl ester-series resin, a diallyl phthalate-series resin, and a thermosetting acrylic resin.

5. The composite according to claim 1, wherein the resin comprises at least one crosslinkable resin selected from the group consisting of a thermoplastic resin having an unsaturated bond and a thermosetting resin having a crosslinkable functional group.

6. The composite according to claim 1, wherein the vulcanization-activating agent comprises a compound having a plurality of α,β-ethylenically unsaturated bonds.

7. The composite according to claim 1, wherein the vulcanization-activating agent comprises a compound having a plurality of (meth)acryloyl groups.

8. The composite according to claim 1, wherein the stabilizer comprises at least one member selected from the group consisting of a phenol-series antioxidant, an amine-series antioxidant, a phosphorus-containing antioxidant, a sulfur-containing antioxidant, a hydroquinone-series antioxidant, a quinoline-series antioxidant, a hindered amine-series light stabilizer, and a quencher.

9. The composite according to claim 1, wherein the stabilizer is capable of capturing a radical.

10. The composite according to claim 1, wherein the proportion of the vulcanization-activating agent is 0.1 to 5 parts by weight relative to 100 parts by weight of the resin, the proportion of the stabilizer is 0.05 to 8 parts by weight relative to 100 parts by weight of the resin, and the proportion (weight ratio) of the vulcanization-activating agent relative to the stabilizer is 98/2 to 35/65.

11. The composite according to claim 1, wherein the rubber comprises at least one member selected from the group consisting of a diene-series rubber, an olefinic rubber, an acrylic rubber, a fluorine-containing rubber, a silicone-series rubber, and a urethane-series rubber.

12. The composite according to claim 1, wherein the unvulcanized rubber is formed from a composition containing at least one vulcanizing agent selected from the group consisting of a radical-generating agent and a sulfur.

13. The composite according to claim 12, wherein the radical-generating agent comprises at least one member selected from the group consisting of an organic peroxide, an azo compound, and a sulfur-containing organic compound.

14. The composite according to claim 12, wherein the proportion of the vulcanizing agent is 1 to 10 parts by weight relative to 100 parts by weight of the unvulcanized rubber.

15. The composite according to claim 1, which further comprises a compound having at least two hydrogen atoms on the average per molecule and having a molecular weight of not more than 1000, wherein each of the hydrogen atoms has an orbital interaction energy coefficient S recited in claim 3 of not less than 0.006.

16. The composite according to claim 1, wherein the resin composition does not comprise a rubber.

* * * * *

UNITED STATES PATENT AND TRADEMARK OFFICE
CERTIFICATE OF CORRECTION

| | | |
|---|---|---|
| PATENT NO. | : 8,029,910 B2 | Page 1 of 1 |
| APPLICATION NO. | : 12/773621 | |
| DATED | : October 4, 2011 | |
| INVENTOR(S) | : Toru Ikuta et al. | |

It is certified that error appears in the above-identified patent and that said Letters Patent is hereby corrected as shown below:

ON THE TITLE PAGE:

Delete the following:

"(30)   Foreign Application Priority Data

Jul. 3, 2002   (JP)   .......................... 2002-195036".

Signed and Sealed this
Twenty-seventh Day of March, 2012

David J. Kappos
*Director of the United States Patent and Trademark Office*